United States Patent
Yin

(10) Patent No.: US 9,867,146 B2
(45) Date of Patent: Jan. 9, 2018

(54) SYSTEMS AND METHODS FOR DUAL-CONNECTIVITY OPERATION

(71) Applicant: Sharp Laboratories of America, Inc., Camas, WA (US)

(72) Inventor: Zhanping Yin, Vancouver Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/453,488

(22) Filed: Aug. 6, 2014

(65) Prior Publication Data

US 2016/0044606 A1 Feb. 11, 2016

(51) Int. Cl.
  H04W 52/32 (2009.01)
  H04W 52/34 (2009.01)
  H04W 88/06 (2009.01)
  H04W 52/14 (2009.01)
  H04W 52/28 (2009.01)
  H04W 52/36 (2009.01)
  H04W 52/50 (2009.01)

(52) U.S. Cl.
  CPC ....... H04W 52/325 (2013.01); H04W 52/346 (2013.01); *H04W 52/146* (2013.01); *H04W 52/281* (2013.01); *H04W 52/367* (2013.01); *H04W 52/50* (2013.01); *H04W 88/06* (2013.01)

(58) Field of Classification Search
  CPC ............. H04W 52/325; H04W 52/146; H04W 52/367; H04W 52/34; H04W 72/0413; H04W 52/248; H04W 72/10; H04W 52/18
  USPC ....................................... 455/450
  See application file for complete search history.

(56) References Cited

U.S. PATENT DOCUMENTS 8,737,211 B2   5/2014  Zhang et al.
2010/0279700 A1  11/2010  Kim et al.
(Continued)

FOREIGN PATENT DOCUMENTS

EP        2760242      7/2014
WO     2013/009892    1/2013
(Continued)

OTHER PUBLICATIONS

LG Electronics, "Summary of email discussion [77-11] ]: Details of priority rule based on UCI type across CGs for dual connectivity power control," 3GPP TSG RAN WG1 Meeting #77, R1-142776, May 2014.
(Continued)

*Primary Examiner* — Kabir A Timory
(74) *Attorney, Agent, or Firm* — Austin Rapp

(57) ABSTRACT

A user equipment (UE) is described. The UE determines that dual-connectivity is configured with more than one cell group. The UE also determines if guaranteed power is configured for one or more cell groups. The UE further determines if a total scheduled transmission power of the cell groups exceeds a maximum allowed transmission power of the UE. The UE additionally determines a priority of uplink control information (UCI) types and channel types among the one or more cell groups. The UE also determines if at least one of channel conversion and partial UCI dropping can be applied on one or more cell groups. The UE additionally determines a power allocation of the uplink channel to be transmitted. The UE transmits UCI and channels on the cell groups.

10 Claims, 17 Drawing Sheets

(56) References Cited

U.S. PATENT DOCUMENTS

| | | |
|---|---|---|
| 2011/0205983 A1 | 8/2011 | Bharadwaj et al. |
| 2012/0113831 A1 | 5/2012 | Pelletier et al. |
| 2012/0257513 A1 | 10/2012 | Yamada |
| 2012/0258707 A1 | 10/2012 | Mathias et al. |
| 2013/0003631 A1 | 1/2013 | Catovic et al. |
| 2013/0188612 A1* | 7/2013 | Dinan ............ 370/336 |
| 2013/0195048 A1* | 8/2013 | Ekpenyong ...... H04W 52/325 370/329 |
| 2013/0265966 A1 | 10/2013 | Yu et al. |
| 2013/0294390 A1 | 11/2013 | Yang et al. |
| 2013/0308612 A1 | 11/2013 | Cai et al. |
| 2014/0010213 A1 | 1/2014 | Wang et al. |
| 2014/0050202 A1 | 2/2014 | Baligh et al. |
| 2014/0119345 A1 | 5/2014 | Sikri et al. |

FOREIGN PATENT DOCUMENTS

| | | |
|---|---|---|
| WO | 2013/020050 | 2/2013 |
| WO | 2013/025236 | 2/2013 |

OTHER PUBLICATIONS

NTT Docomo, "Summary of Email Discussion [77-13]: Details of PxeNB for Power-Control of Dual Connectivity," 3GPP TSG RAN WG1 Meeting #77, R1-142778, May 2014.

Panasonic, "Summary of Email Discussion [77-12]: 'Look-Ahead' Aspect for Dual Connectivity Power Control," 3GPP TSG RAN WG1 Meeting #77, R1-142783, May 2014.

InterDigital et al., "Way Forward on Power Sharing for Dual Connectivity," 3GPP TSG RAN WG1 #77, R1-142589, May 2014.

LG Electronics et al., "WF on Power Control for Dual-Connectivity," 3GPP TSG RAN WG1 #77, R1-142675, May 2014.

3GPP TSG RAN WG1 Meeting #77, "RAN1 Chairman's Notes," Seoul, Korea, May 19-23, 2014.

3GPP TS 36.213 12.2.0, Evolved Universal Terrestrial Radio Access (E-UTRA) Physical Layer Procedures (Release 12), Jun. 2014.

Search Report and Written Opinion issued for International Application No. PCT/US2015/043671 dated Jan. 11, 2016.

* cited by examiner

SYSTEMS AND METHODS FOR DUAL-CONNECTIVITY OPERATION

TECHNICAL FIELD

The present disclosure relates generally to communication systems. More specifically, the present disclosure relates to systems and methods for dual-connectivity operation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

DETAILED DESCRIPTION

Figure 1:
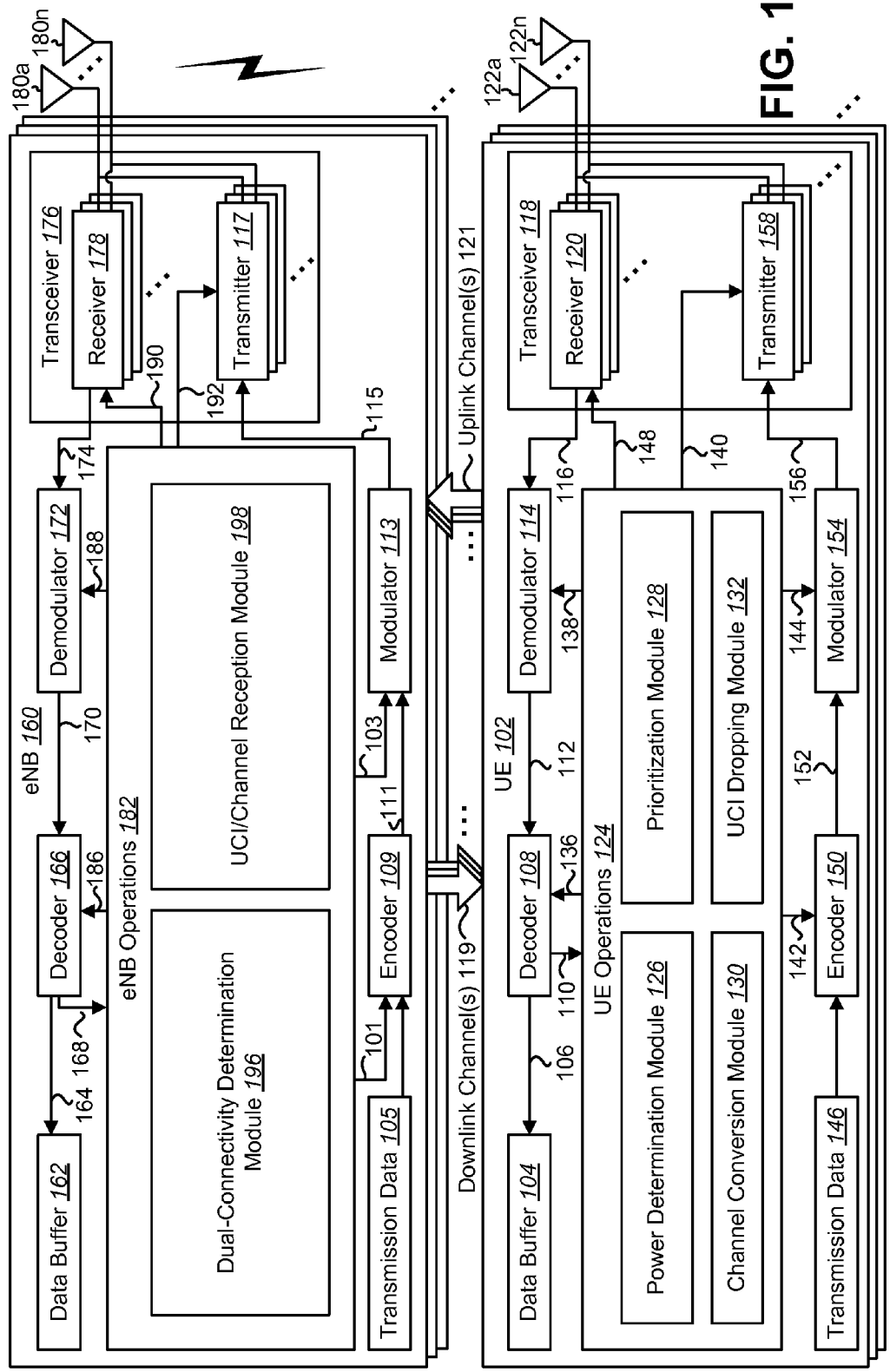
FIG. 1 is a block diagram illustrating one configuration of one or more evolved Node Bs (eNBs) and one or more user equipments (UEs) in which systems and methods for dual-connectivity operation may be implemented.

A user equipment (UE) is disclosed. The user equipment includes a processor, a memory in electronic communication with the processor and instructions stored in memory. The instructions are executable to determine that dual-connectivity is configured with more than one cell group. The instructions are also executable to determine if guaranteed power is configured for one or more cell groups. The instructions are further executable to determine if a total scheduled transmission power of the one or more cell groups exceeds a maximum allowed transmission power of the UE. The instructions are additionally executable to determine a priority of uplink control information (UCI) types and channel types among the one or more cell groups. The instructions are also executable to determine if at least one of channel conversion and partial UCI dropping can be applied on one or more cell groups. The instructions are further executable to determine a power allocation of an uplink channel to be transmitted. The instructions are further executable to transmit uplink channels on the one or more cell groups.

If guaranteed power is configured for one or more cell groups, and if total scheduled transmission power of the one or more cell groups exceeds the maximum allowed transmission power of the UE, and if a physical random access channel (PRACH) is to be transmitted on a first cell group and the PRACH is not to be transmitted on a second cell group, then the PRACH may be transmitted with required power and the guaranteed power of the second cell group may be ignored. The uplink channels of the second cell group may be transmitted with remaining power with priority and scaling rules.

If guaranteed power is configured for one or more cell groups, and if total scheduled transmission power of the one or more cell groups exceeds the maximum allowed transmission power of the UE, and if a PRACH is to be transmitted on both a master cell group (MCG) and a secondary cell group (SCG), then the PRACH may be transmitted on the MCG with required power and the guaranteed power of the SCG may be ignored. The PRACH may be transmitted on the SCG with remaining power or drop the PRACH on the SCG if the power is below a threshold.

If guaranteed power is configured for one or more cell groups, and if the total scheduled transmission power of the one or more cell groups exceeds the maximum allowed transmission power of the UE, and uplink transmission is scheduled on the one or more cell groups, then the guaranteed power and remaining power may be allocated based on channel type and UCI type across the one or more cell groups. One or more channels with higher priority may be transmitted with allocated power in the one or more cell groups. Other channels of the one or more cell groups may be dropped or power scaled.

If a physical uplink control channel (PUCCH) or physical uplink shared channel (PUSCH) is scheduled on a first cell group, then the remaining power may be allocated based on a priority of, PRACH>scheduling request (SR)>hybrid automatic request acknowledgement/negative acknowledgment (HARQ-ACK)>channel state information (CSI)>PUSCH data>sounding reference signal (SRS) across one or more cell groups.

If UCI is carried on a PUSCH transmission for a first cell group, and if a total transmission power of all cell groups with the UCI on a PUCCH of the first cell group does not exceed the maximum allowed transmission power of the UE, then the UCI may be transmitted on PUCCH and the PUSCH transmission of the first cell group may be dropped.

If simultaneous HARQ-ACK and CSI is configured on a first cell group, and HARQ-ACK and CSI are reported in a PUCCH of the first cell group, and if a total transmission power of all cell groups with HARQ-ACK only on a PUCCH of the first cell group does not exceed the maximum allowed transmission power of the UE, then the HARQ-ACK may be transmitted only on PUCCH of the first cell group and the CSI of the first cell group may be dropped.

If UCI is carried on a PUCCH transmission for a first cell group, and if the allocated power for the PUCCH by ensuring guaranteed power and priority rules is below a threshold for acceptable UCI report performance, then the UCI and PUCCH transmission may be dropped. If UCI is carried on a PUSCH transmission for a first cell group, and if the allocated power for the PUSCH by ensuring the guaranteed power and priority rules is below a threshold for acceptable UCI report performance, then drop the UCI and PUSCH transmission may be dropped.

If simultaneous PUCCH and PUSCH transmission is configured on a first cell group, and HARQ-ACK is reported on PUCCH and CSI is reported on PUSCH of the first cell group, then uplink transmission power may be allocated with guaranteed power and remaining power on a first channel with UCI of each cell group first before a second channel with UCI on each cell group. The PUCCH may be the first channel with UCI and the PUSCH may be the second channel with UCI if HARQ-ACK is reported on PUCCH and CSI is reported on a PUSCH of the first cell group if simultaneous PUCCH and PUSCH transmission is configured. The PUCCH or PUSCH with UCI may be the first channel with UCI of the cell group if simultaneous PUCCH and PUSCH transmission is not configured.

An evolved NodeB (eNB) is also described. The eNB includes a processor, a memory in electronic communication with the processor and instructions stored in memory. The instructions are executable to determine that dual connectivity is configured with more than one cell group. The instructions are also executable to determine if guaranteed power is configured for one or more cell groups. The instructions are further executable to receive uplink control information (UCI) and channels on a cell group. The receiving is based on different assumptions of whether: a total scheduled transmission power of the cell groups exceeds a maximum allowed transmission power of a user equipment (UE); a priority of UCI types and channel types among the cell groups; whether UCI is carried on a physical uplink shared channel (PUSCH) transmission for a cell group; whether simultaneous hybrid automatic repeat request acknowledgement/negative acknowledgement (HARQ-ACK) and channel state information (CSI) reporting is configured on a cell group; and whether simultaneous physical uplink control channel (PUCCH) and PUSCH transmission is configured on a cell group.

If guaranteed power is configured for one or more cell groups, and if total scheduled transmission power of the one or more cell groups exceeds the maximum allowed transmission power of the UE, and if a physical random access channel (PRACH) is to be transmitted on a first cell group and the PRACH is not to be transmitted on a second cell group, then the PRACH may be received with required power and the guaranteed power of the second cell group may be ignored. The uplink channels of the second cell group may be received with remaining power with priority and scaling rules.

If guaranteed power is configured for one or more cell groups, and if total scheduled transmission power of the one or more cell groups exceeds the maximum allowed transmission power of the UE, and if a physical random access channel (PRACH) is to be transmitted on both a master cell group (MCG) and a secondary cell group (SCG), then the PRACH on the MCG may be received with required power and the guaranteed power of the SCG may be ignored. The PRACH on the SCG may be received with remaining power or the PRACH may not be detected on the SCG if the power is below a threshold.

If guaranteed power is configured for one or more cell groups, and if the total scheduled transmission power of the one or more cell groups exceeds the maximum allowed transmission power of the UE, and uplink transmission is scheduled on the one or more cell groups, then one or more channels with higher priority may be received with an allocated power in the one or more cell groups.

If UCI is carried on a PUSCH transmission for a first cell group, and if a total transmission power of all cell groups with a UCI-only transmission on a PUSCH of the first cell group does not exceed the maximum allowed transmission power of the UE, then the UCI may be received only on the PUSCH of the first cell group.

If UCI is carried on a PUSCH transmission for a first cell group, and if a total transmission power of all cell groups with the UCI on a PUCCH of the first cell group does not exceed the maximum allowed transmission power of the UE, then the UCI may be received on the PUCCH of the first cell group. The PUSCH transmission of the first cell group may be dropped.

If simultaneous HARQ-ACK and CSI is configured on a first cell group, and HARQ-ACK and CSI are reported in a PUCCH of the first cell group, and if a total transmission power of all cell groups with HARQ-ACK only on a PUCCH of the first cell group does not exceed the maximum allowed transmission power of the UE, then the HARQ-ACK may be received only on the PUCCH of the first cell group. The CSI of the first cell group may be dropped.

A method for dual-connectivity operation by a UE is also described. The method includes determining that dual-connectivity is configured with more than one cell group. The method also includes determining if guaranteed power is configured for one or more cell groups. The method further includes determining if a total scheduled transmission power of the one or more cell groups exceeds a maximum allowed transmission power of the UE. The method additionally includes determining a priority of uplink control information (UCI) types and channel types among the one or more cell groups. The method also includes determining if at least one of channel conversion and partial UCI dropping can be applied on one or more cell groups. The method further includes determining a power allocation of an uplink channel to be transmitted. The method also includes transmitting uplink channels on the one or more cell groups.

A method for dual-connectivity operation by an eNB is also described. The method includes determining that dual-connectivity is configured with more than one cell group. The method also includes determining if guaranteed power is configured for one or more cell groups. The method further includes receiving uplink control information (UCI) and channels on a cell group. The receiving is based on different assumptions of: whether a total scheduled transmission power of the cell groups exceeds a maximum allowed transmission power of a user equipment (UE); a priority of UCI types and channel types among the cell groups; whether UCI is carried on a physical uplink shared channel (PUSCH) transmission for a cell group; whether simultaneous hybrid automatic repeat request acknowledgement/negative acknowledgement (HARQ-ACK) and channel state information (CSI) reporting is configured on a cell group; and whether simultaneous physical uplink control channel (PUCCH) and PUSCH transmission is configured on a cell group.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall descriptions, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or zero, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for dual-connectivity operation. This may be done in the context of an evolved universal terrestrial radio access network (E-UTRAN). For example, dual-connectivity operation between a user equipment (UE) and two or more eNBs on an E-UTRAN is described. In one configuration, the two or more eNBs may have different schedulers.

The systems and methods described herein may enhance the efficient use of radio resources in dual-connectivity operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, dual-connectivity between the UE and E-UTRAN may be utilized. For example, in addition to Rel-11 operation, a UE operating according to the Rel-12 standard may be configured with dual-connectivity (which may also be referred to as multi-connectivity, inter-eNB carrier aggregation, multi-flow, multi-cell cluster, multi-Uu, etc.). Because a maximum of two connections are currently considered, terminology of "dual-connectivity" may be used. The UE may connect to the E-UTRAN with multiple Uu interfaces, if configured. For instance, the UE may be configured to establish one or more additional radio interfaces by using one radio interface. Hereafter, one node is referred to as master eNB (MeNB) and another node is referred to as secondary eNB (SeNB).

Dual-connectivity may provide an enhancement for small cell deployment. One of the key issues associated with dual-connectivity is the uplink power control for simultaneous uplink channel transmissions. In a power unlimited case, the uplink channel on each cell group may be transmitted using existing power control parameters and procedures. As used herein, the power unlimited case means that the total scheduled transmission power of uplink signals on all cell groups does not exceed the maximum allowed transmission power (i.e. Pcmax), of the given UE. However, in a power limited case, where the total scheduled uplink transmission powers on a master cell group (MCG) and a secondary cell group (SCG) exceed the maximum allowed transmission power of the UE (Pcmax), the UE has to perform uplink channel prioritization and power scaling on one or both uplink channels so that the total transmission power is within the power limit.

There are many approaches to perform uplink channel power control and power scaling. The uplink channel power control and power scaling may be based on the type of uplink channels or the type of control information. The systems and methods disclosed herein are related to controlling the uplink channel priority using different channel types and uplink control information (UCI). These approaches consider the guaranteed power of each cell group and allocate power accordingly. Several approaches for channel conversions and UCI dropping to allow the transmission to be sent while there is a guaranteed power restriction are also discussed.

In one approach, the total power may be evaluated based on channel and UCI information. Conditions and orders for power allocation may also be provided. In this approach, dual-connectivity may be achieved by utilizing cell group behaviors in order to minimize potential specification impacts. For example, the guaranteed power may be allocated for the more important UCI information. In another approach, channel conversion rules may be based on configurations with and without simultaneous physical uplink control channel (PUCCH) and physical uplink shared channel PUSCH transmission.

For dual-connectivity, both synchronized and non-synchronized networks may be supported. Separate UCI reporting may be performed on each cell group. Hybrid automatic repeat request acknowledgement/negative acknowledgement (HARQ-ACK) and channel state information (CSI) related to the MCG may be transmitted to the MeNB only. UCI related to the PDSCH/PUSCH operation in the SCG may be transmitted to the SeNB only. For example, the HARQ-ACK for the PDSCH of the SCG cells and/or periodic and aperiodic CSI of the SCG cells may be transmitted to the SeNB only.

In an SCG, the UCI transmission rules as in Rel-11 may be supported, with the primary cell (PCell) replaced by the primary secondary cell (PSCell). The UCI transmission rules may include the physical channel (physical uplink control channel (PUCCH) or PUSCH) in which UCI is transmitted; selection of the cell in which UCI is transmitted in the case of UCI on PUSCH; selection of PUCCH resources for HARQ-ACK; periodic CSI dropping rules; handling of UCI combinations; and HARQ-ACK timing and multiplexing.

The MCG serving cells may carry signaling radio bearers (SRBs) and are, therefore, essential for maintaining the connection toward the UE. The preamble transmission in the PCell is considered more important than the preamble transmission in any other cell. Therefore, in the case of dual-connectivity, a UE may give higher priority to a PUSCH transmission on the MCG than a PUCCH transmission on the SCG.

The described systems and methods evaluate the total power based on PUCCH and/or PUSCH information. Various conditions and orders of power allocation are described for different scenarios. The described systems and methods may utilize legacy behaviors in most cases to minimize potential specification impacts while facilitating the new requirements of dual-connectivity.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for dual-connectivity operation may be implemented. The one or more UEs 102 may communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a*-*n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a*-*n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a power determination module 126, a channel conversion module 130, a UCI dropping module 132 and a prioritization module 128.

The power determination module 126 may determine if guaranteed power is configured for one or more cell groups. In one configuration, the power determination module 126 may configure the guaranteed power for an MCG and not for an SCG. This may ensure transmissions made by the MCG are transmitted and transmissions by the SCG may wait until there is enough secondary power to send transmissions.

In another configuration, the power determination module 126 may reserve the guaranteed power on each cell group for a transmission that contains UCI (e.g., UCI on PUCCH or a PUSCH with UCI). In this configuration, if a cell group only has a PUSCH data transmission, the guaranteed power may not be reserved for the cell group.

The power determination module 126 may determine if a total scheduled transmission power of the one or more cell groups exceeds a maximum power. If the total scheduled transmission power of the cell groups does not exceed the maximum allowed transmission power of the UE 102 (Pcmax), then the UE 102 is in a power unlimited case. In this case, simultaneous uplink transmission from the MCG and the SCG may be performed independently according to scheduled uplink transmission powers and existing priority rules within each cell group.

The prioritization module 128 may be used to determine a priority of uplink control information types and channel types among the one or more cell groups. Different physical uplink channels 121 and UCI achieve different functions. Thus, different physical uplink channels 121 and UCI have different importance to UE 102 operation.

The prioritization module 128 may determine that for the same type of uplink channels 121 or UCI types, the uplink channel 121 on the MCG has higher priority than the uplink channel 121 on the SCG because the MCG is normally used to provide mobility, RRC functionalities and voice services such as SPS transmissions.

The priority determination module 128 may also use a sounding reference signal (SRS) to assist uplink channel 121 estimation and prioritization. In one configuration, the SRS may have the lowest priority in power allocation. An SRS transmission may not be as important as a physical random access channel (PRACH) transmission or other transmission on the cell groups. If a cell group only has an SRS transmission, the prioritization module 128 may indicate to the power determination module 126 to not reserve guaranteed power for the SRS transmission due to the lower priority of the transmission. In this configuration the SRS transmission may be dropped if there is not enough power for the SRS transmission or the SRS transmission may be transmitted using any remaining power.

The channel conversion module 130 may be used to determine if channel conversion can be applied on one or more cell groups. With dual-connectivity, simultaneous PUCCH transmission on the MCG and the SCG, may need to be supported. In one approach, if guaranteed power is configured on a cell group for a PUCCH transmission, the channel conversion module 130 may evaluate if the guaranteed power on the cell group is sufficient for the PUCCH transmission. If the guaranteed power is not sufficient for the PUCCH transmission, the channel conversion module 130 may evaluate the allocation of power to determine if there is enough available power for the PUCCH transmission.

In another approach, if the guaranteed power is configured for UCI on a PUSCH transmission, the channel conversion module 130 may evaluate if the guaranteed power on the cell group is sufficient for the UCI on the PUSCH transmission. If the guaranteed power is not sufficient for the UCI in the PUSCH transmission, the channel conversion module 130 may further evaluate the allocation of power to determine if there is enough available power for the UCI on the PUSCH transmission The UCI dropping module 132 may determine if partial UCI dropping can be applied on one or more cell groups. Any power remaining after the allocation of guaranteed power may be allocated based on UCI and priority rules. In one configuration, the power to transmit a UCI on PUCCH transmission may be based on the number of bits in the payload of the transmission. The guaranteed power may not be sufficient for certain types of PUCCH transmissions (e.g., simultaneous HARQ-ACK on PUCCH and CSI on PUCCH transmissions). In the case of the guaranteed power being insufficient, transmission degradation may occur and the UCI dropping module 132 may determine to drop some transmission packets. One example of an error that may occur due to insufficient power is dropping packets that were unsuccessfully transmitted. Another example is re-transmitting packets that were already received. Another error may be bad channel adaptation and MCS settings due to a wrong CSI report.

The UE operations module 124 may provide information 148 to the one or more receivers 120. The UE operations module 124 may also provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of a dual-connectivity determination module 196 and a UCI/channel reception module 198. The eNB operations module 182 may provide the benefit of utilizing the radio resources of the MCG and the SCG efficiently.

If the eNB 160 supports dual-connectivity, the dual-connectivity determination module 196 may determine that dual-connectivity is configured with more than one cell group. For example, the eNB 160 may provide one cell group and another eNB 160 may provide a second cell group. The cell group may be an MCG or an SCG.

The UCI/channel reception module 198 may receive UCI and channels on a cell group based on different assumptions of whether a total scheduled transmission power of the cell groups exceeds a maximum allowed transmission power of a UE 102. It should be noted that the eNB 160 of one cell group may not know the required transmission power of another cell group. If the total scheduled transmission power of the cell groups does not exceed the maximum allowed transmission power of the UE 102, then the UE 102 is in a power unlimited case. In this case, simultaneous uplink transmission from the MCG and the SCG should be performed independently by the UE 102. The eNB 160 may expect to receive the uplink channels on the cell group with the scheduled power.

If the total scheduled transmission power of the cell groups exceeds the maximum allowed transmission power of the UE 102, then the UE 102 is in a power-limited case. In this case, if the total scheduled uplink transmission powers on the MCG and the SCG exceeds Pcmax, the UCI/channel reception module 198 may receive UCI and/or channels based on uplink channel prioritization and power scaling on one or both uplink channels 121 so that the total transmission power is within the power limit. An uplink channel 121 with the lower priority may be dropped or power scaled down before an uplink channel 121 with higher priority. The UCI/channel reception module 198 may receive the UCI and/or channels for a cell group based on the priority rules described in connection with FIG. 4. Thus, the eNB 160 may expect that some of the scheduled uplink transmissions or channels are dropped or are transmitted with reduced power. In other words, the eNB 160 may expect that some scheduled uplink transmissions or channels are dropped or not transmitted with the scheduled power.

The UCI/channel reception module 198 may also receive UCI and channels on a cell group based on whether UCI is scheduled to be carried on a PUSCH transmission for the cell group. For PUSCH transmissions, a PUSCH with UCI may be prioritized over a PUSCH without UCI. Therefore, in a power-limited case, the eNB 160 may expect that the PUSCH without UCI may be dropped or power scaled before the PUSCH with UCI within each cell group.

The UCI/channel reception module 198 may further receive UCI and channels on a cell group based on different assumptions of whether a total transmission power of all cell groups with UCI-only transmissions exceeds the maximum allowed transmission power of the UE 102. In one configuration, if the total transmission power of all cell groups with a UCI-only transmission on a PUSCH is less than the maximum allowed transmission power of the UE 102, the UCI/channel reception module 198 may receive UCI on the PUSCH in a UCI-only PUSCH report. The eNB 160 may expect further power scaling is applied for the PUSCH data transmission.

If the total transmission power with UCI-only on PUSCH still exceeds the maximum allowed transmission power of the UE 102, the UCI/channel reception module 198 may receive UCI and channels based on the priority rules described in connection with FIG. 4. The UCI and channel dropping may be based on uplink channel 121 type and UCI type. For example, if the UCI on the PUSCH transmission has lower priority, the PUSCH with UCI may be dropped. If the UCI on the PUSCH transmission has higher priority than the uplink channel 121 of the other cell group, the PUSCH with UCI on the given cell group may be received.

In another configuration, the UCI/channel reception module 198 may receive a UCI transmission on a PUCCH. As described above, PUSCH with data transmission normally requires more power than a PUCCH transmission. Therefore, as an alternative to receiving UCI on PUSCH-only transmissions, the eNB 160 may expect to receive UCI on a PUCCH transmission instead of a PUSCH transmission.

The eNB operations module 182 may provide information 190 to the one or more receivers 178. For example, the eNB operations module 182 may inform the receiver(s) 178 when or when not to receive transmissions based on the received UCI and channels.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102. The RRC connection reconfiguration message may or may not include SCG configuration parameters for SCG addition modification. The eNB operations module 182 may send, to the other eNB 160, the RRC connection reconfiguration message to be signaled to the UE 102. For example, the other eNB 160 may receive the SCG configuration parameters for SCG addition or modification from the eNB 160 as a container. The eNB 160 may generate a RRC connection reconfiguration message that may include the received container and may send the RRC connection reconfiguration message to the UE 102.

The eNB 160 may just send a RRC connection reconfiguration message included in the received container.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
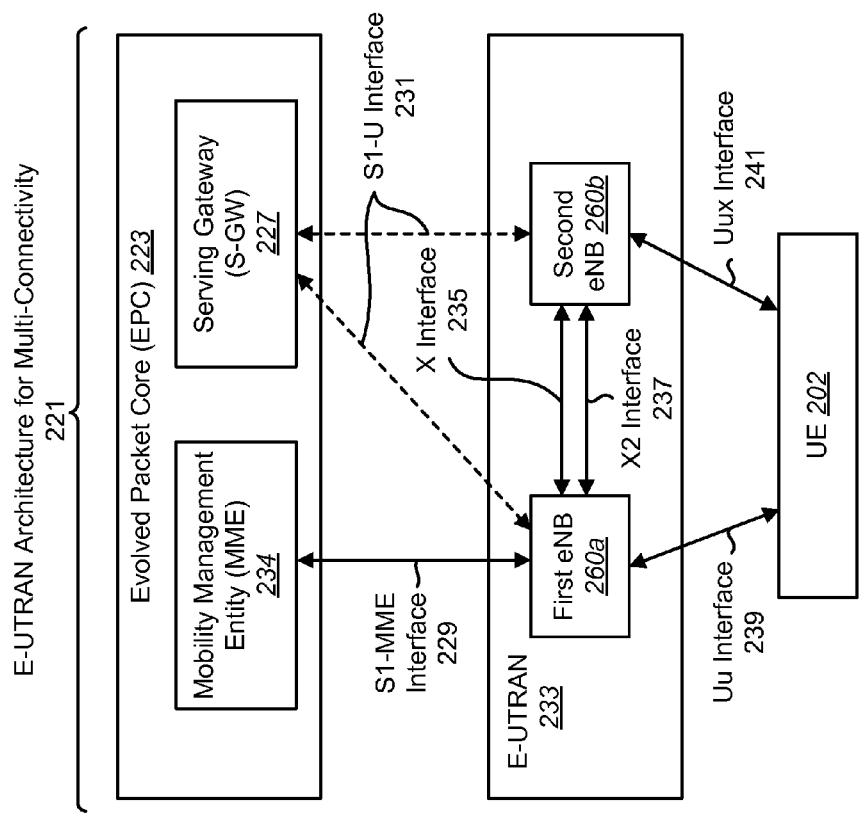
FIG. 2 is a block diagram illustrating configurations of E-UTRAN architecture in which systems and methods for dual-connectivity operation may be implemented.

FIG. 2 is a block diagram illustrating configurations of E-UTRAN architecture 221 in which systems and methods for dual-connectivity operation may be implemented. The UE 202 described in connection with FIG. 2 may be implemented in accordance with the UE 102 described in connection with FIG. 1. The eNBs 260a-b described in connection with FIG. 2 may be implemented in accordance with the eNB 160 described in connection with FIG. 1.

The E-UTRAN architecture for multi-connectivity 221 is one example of E-UTRAN architecture that may provide dual-connectivity for a UE 202. In this configuration, the UE 202 may connect to E-UTRAN 233 via a Uu interface 239 and a Uux interface 241. The E-UTRAN 233 may include a first eNB 260a and a second eNB 260b. The eNBs 260a-b may provide the E-UTRA user plane (PDCP/RLC/MAC/PHY) and control plane (RRC) protocol terminations toward the UE 202. The eNBs 260a-b may be interconnected with each other by an X2 interface 237. The S1 interfaces 229, 231 may support a many-to-many relation between MMEs 234, serving gateways 227 and eNBs 260a-b. The first eNB (e.g., MeNB) 260a and the second eNB (e.g., SeNB) 260b may also be interconnected with each other by means of one or more X interfaces 235, which may or may not be the same as the S1-MME 229 and/or X2 interface 237.

The eNBs 260 may host a variety of functions. For example, the eNBs 260 may host functions for radio resource management (e.g., radio bearer control, radio admission control, connection mobility control, dynamic allocation of resources to UEs 202 in both uplink and downlink (scheduling)). The eNBs 260 may also perform IP header compression and encryption of user data stream; selection of an MME 234 at UE 202 attachment when no routing to an MME 234 can be determined from the information provided by the UE 202; and routing of user plane data toward the serving gateway 227. The eNBs 260 may additionally perform scheduling and transmission of paging messages (originated from the MME 234); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 234). The eNBs 260 may further perform closed subscriber group (CSG) handling and transport level packet marking in the uplink.

The MME 234 may host a variety of functions. For example, the MME 234 may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 234 may also perform tracking area list management (for a UE 202 in idle and active mode); packet data network gateway (PDN GW) and S-GW selection; MME 234 selection for handovers with MME 234 change; and Serving GPRS Support Node (SGSN) selection for handovers to 2G or 3G 3GPP access networks. The MME 234 may additionally host roaming, authentication, and bearer management functions (including dedicated bearer establishment). The MME 234 may provide support for PWS (which includes ETWS and CMAS) message transmission, and may optionally perform paging optimization.

The S-GW 227 may also host the following functions. The S-GW 227 may host the local mobility anchor point for inter-eNB 260 handover. The S-GW 227 may perform mobility anchoring for inter-3GPP mobility; E-UTRAN idle mode downlink packet buffering and initiation of network triggered service request procedure; lawful interception; and packet routing and forwarding. The S-GW 227 may also perform transport level packet marking in the uplink and the downlink; accounting on user and QoS Class Identifier (QCI) granularity for inter-operator charging; and uplink (UL) and downlink (DL) charging per UE 202, packet data network (PDN), and QCI.

The radio protocol architecture of E-UTRAN 233 may include the user plane and the control plane. The user plane protocol stack may include PDCP, RLC, MAC and PHY sublayers. The PDCP, RLC, MAC and PHY sublayers (terminated at the eNB 260a on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 260a on the network side) may perform functions (e.g., ciphering and integrity protection) for the control plane. The RLC and MAC sublayers (terminated in eNB on the network side) may perform the same functions as for the user plane. The RRC (terminated in eNB 260a on the network side) may perform the following functions. The RRC may perform broadcast functions, paging, RRC connection management, radio bearer (RB) control, mobility functions, UE 202 measurement reporting and control. The NAS control protocol (terminated in MME 234 on the network side) may perform, among other things, evolved packet system (EPS) bearer management, authentication, evolved packet system connection management (ECM)-IDLE mobility handling, paging origination in ECM-IDLE and security control.

The first eNB 260a and the second eNB 260b may be connected by the S1 interfaces 229, 231 to the EPC 223. The first eNB 260a may be connected to the MME 234 by the S1-MME interface 229. In one configuration, the second eNB 260b may be connected to the serving gateway 227 by the S1-U interface 231 (as indicated by a dashed line). The first eNB 260a may behave as the MME 234 for the second eNB 260b so that S1-MME interface 229 for the second eNB 260b may be connected (via the X interface 235, for instance) between the first eNB 260a and the second eNB 260b. Therefore, the first eNB 260a may appear to the second eNB 260b as an MME 234 (based on the S1-MME interface 229) and an eNB 260 (based on the X2 interface 237).

In another configuration, first eNB 260a may also be connected to the serving gateway 227 by the S1-U interface 231 (as indicated by a dashed line). Therefore, the second eNB 260b may not be connected to the EPC 223. The first eNB 260a may appear to the second eNB 260b as an MME 234 (based on the S1-MME interface 229), an eNB (based on the X2 interface 237), and an S-GW 227 (based on the S1-U interface 231). This architecture 221 may provide a single node S1 interface 229, 231 (e.g., connection) with the EPC 223 for the first eNB 260a and the second eNB 260b. By the single node connection with EPC 223, MME 234 S-GW 227, a change (e.g., handover) could be mitigated as long as the UE 202 is in the coverage of the first eNB 260a.

Figure 3:
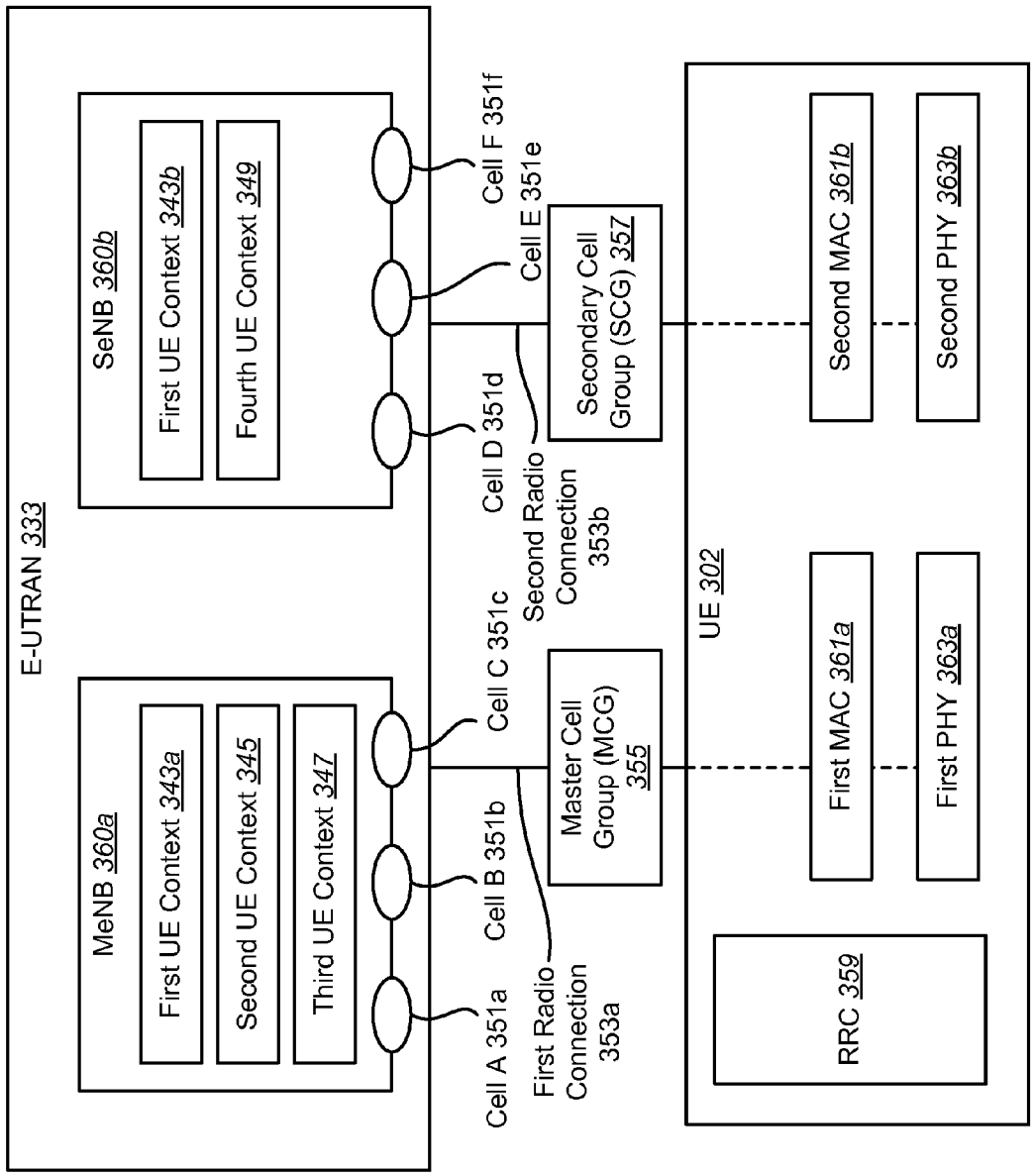
FIG. 3 is a block diagram illustrating one configuration of an E-UTRAN and a UE in which systems and methods for dual-connectivity operation may be implemented.

FIG. 3 is a block diagram illustrating one configuration of an E-UTRAN 333 and a UE 302 in which systems and methods for dual-connectivity operation may be implemented. The UE 302 and the E-UTRAN 333 described in connection with FIG. 3 may be implemented in accordance with corresponding elements described in connection with at least one of FIGS. 1 and 2.

In traditional carrier aggregation, a single eNB 360 is assumed to provide multiple serving cells 351 for a UE 302. Even in scenarios where two or more cells 351 may be aggregated (e.g., a macro cell aggregated with remote radio head (RRH) cells 351), the cells 351 may be controlled (e.g., scheduled) by a single eNB 360. However, in a small cell deployment scenario, each eNB 360 (e.g., node) may have its own independent scheduler. To utilize radio resources of both eNBs 360a-b, the UE 302 may connect to both eNBs 360a-b.

When carrier aggregation is configured, the UE 302 may have one RRC connection with the network. A radio interface may provide carrier aggregation. During RRC connection establishment, re-establishment and handover, one serving cell 351 may provide NAS mobility information (e.g., a tracking area identity (TAI)). During RRC connection re-establishment and handover, one serving cell 351 may provide a security input. This cell 351 may be referred to as the primary cell (PCell). In the downlink, the component carrier corresponding to the PCell may be the downlink primary component carrier (DL PCC), while in the uplink it may be the uplink primary component carrier (UL PCC).

Depending on UE 302 capabilities, one or more SCells may be configured to form together with the PCell a set of serving cells 351a-f. In the downlink, the component carrier corresponding to a SCell may be a downlink secondary component carrier (DL SCC), while in the uplink it may be an uplink secondary component carrier (UL SCC).

The configured set of serving cells 351a-f for the UE 302, therefore, may consist of one PCell and one or more SCells. For each SCell, the usage of uplink resources by the UE 302 (in addition to the downlink resources) may be configurable. The number of DL SCCs configured may be larger than or equal to the number of UL SCCs and no SCell may be configured for usage of uplink resources only.

From a UE 302 viewpoint, each uplink resource may belong to one serving cell 351. The number of serving cells 351 that may be configured depends on the aggregation capability of the UE 302. The PCell may only be changed using a handover procedure (e.g., with a security key change and a random access channel (RACH) procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

An RRC 359 may perform the reconfiguration, addition and removal of SCells. At intra-LTE handover, RRC 359 may also add, remove or reconfigure SCells for usage with a target PCell. When adding a new SCell, dedicated RRC signaling may be used for sending all required system information of the SCell (e.g., while in connected mode, UEs 302 need not acquire broadcasted system information directly from the SCells).

However, to connect to both eNBs 360 that have different schedulers, dual-connectivity between the UE 302 and E-UTRAN 333 may be required. In addition to Release-11 operation, a UE 302 operating according to Release-12 may be configured with dual-connectivity (which may also be called multi-connectivity, inter-node carrier aggregation, inter-node radio aggregation, multi-flow, multi-cell cluster, multi-Uu, etc.).

The UE 302 may connect to E-UTRAN 333 with multiple Uu interfaces 239, 241, if configured. For example, a UE 302 may be configured to establish an additional radio interface (e.g., radio connection 353) by using one radio interface (radio connection 353). Hereafter, one eNB 360 is referred to as a master eNB (MeNB) 360a, which may also be called a primary eNB (PeNB). Another eNB 360 is referred to as s secondary eNB (SeNB) 360b. The Uu interface 239 (which may be called primary Uu interface) is a radio interface between the UE 302 and the MeNB 360a. The Uux interface 241 (which may be called secondary Uu interface) is a radio interface between the UE 302 and the SeNB 360b.

In one configuration, the UE 302 may not be required to be aware of the MeNB 360a and SeNB 260b as long as the UE 302 is aware of multiple Uu interfaces 239, 241 (i.e., MCG 355 and SCG 357) with the E-UTRAN 333. Also, the E-UTRAN 333 may provide multiple Uu interfaces with the same or different eNBs 360.

In one configuration, the MeNB 360a and SeNB 360b could be the same eNB 360. The multiple Uu interfaces 239, 241 (e.g., dual-connectivity) can be achieved even by a single eNB 360. The UE 302 may be able to connect more than one Uux interface 241 (e.g., Uu1, Uu2, Uu3 . . . ). Each Uu interface 239, 241 can have carrier aggregation. Therefore, the UE 302 may be configured with more than one set of serving cells 351 in case of CA. In dual-connectivity (i.e., two sets), one set of serving cells 351 may be the MCG 355, another set of serving cells may be the SCG 357.

Multiple Uu interfaces 239, 241 are described herein, but this functionality could be realized by a single Uu interface 239 depending on the definition of Uu interface 239. Dual-connectivity may be realized by a single Uu interface 239 or a single radio interface depending on the definition of the interface. A radio interface can be defined as an interface between a UE 302 and the E-UTRAN 333, but not an interface between the UE 302 and an eNB 360. For example, one radio interface can be defined as an interface between a UE 302 and the E-UTRAN 333 with dual-connectivity. Therefore, the difference between the Uu 239 and Uux 241 above may be considered as a characteristic of cells 351. The Uu interface 239 and the Uux interface 241 may be rephrased by a set A of cell(s) and a set B of cell(s), respectively. Also, a radio interface and an additional radio interface can be rephrased by a master cell group (MCG) 355 and secondary cell group (SCG) 357, respectively.

In some implementations, the E-UTRAN 333 may include a MeNB 360a and a SeNB 360b. The UE 302 may communicate with the MeNB 360a via a first radio connection 353a. The UE 302 may communicate with the SeNB 360b via the second radio connection 353b. While FIG. 3 depicts one first radio connection 353a and one second radio connection 353b, the UE 302 may be configured with one first radio connection 353a and one or more second radio connections 353b. The MeNB 360a and SeNB 360b may be implemented in accordance with the eNB 160 described in connection with FIG. 1.

The MeNB 360a may provide multiple cells 351a-c for connection to one or more UEs 302. For example, the MeNB 360a may provide cell A 351a, cell B 351b and cell C 351c. Similarly, the SeNB 360b may provide multiple cells 351d-f. The UE 302 may be configured to transmit/receive on one or more cells (e.g., cell A 351a, cell B 351b and cell C 351c) for the first radio connection 353a (e.g., a master cell group (MCG) 355). The UE 302 may also be configured to transmit/receive on one or more other cells (e.g., cell D 351d, cell E 351e and cell F 351f) for the second radio connection 353b (e.g., a secondary cell group (SCG) 357).

The MCG 355 may contain one PCell and one or more optional SCell(s). The SCG 357 may contain one PCell-like cell (that may be called PCell, primary SCell (PSCell), secondary PCell (SPCell), PCellscg, SCG PCell, etc.) and one or more optional SCell(s). If the UE 302 is configured to transmit/receive on multiple cells 351a-f for a radio connection 353a-b, a carrier aggregation operation may be applied to the radio connection 353a-b. In one configuration, each radio connection 353 may be configured with a primary cell and no, one, or more secondary cell(s). In another configuration, at least one radio connection 353 may be configured with a primary cell and no, one, or more secondary cell(s) and the other radio connections 353 may be configured with one or more secondary cell(s). In yet another configuration, at least one radio connection 353 may be configured with a primary cell and no, one, or more secondary cell(s) and the other radio connections 353 may be configured with a PCell-like cell and no, one or more secondary cell(s).

One MAC entity 361 and one PHY entity 363 may be mapped to one cell group. For example, a first MAC entity 361a and a first PHY entity 363a may be mapped to the MCG 355. Similarly, a second MAC entity 361b and a second PHY entity 363b may be mapped to the SCG 357. The UE 302 may be configured with one MCG 355 (e.g., the first radio connection 353a) and optionally one or more SCG(s) 357 (e.g., the second connection 353b).

The MeNB 360a manages and stores UE contexts for the first radio connection 353a. The UE contexts may be RRC contexts (e.g., configurations, configured cells 351, security information, etc.), QoS information and UE 302 identities for each UE 302 for configured cells 351 for the UE 302. For example, the MeNB 360a may manage and store a first UE context 343a, a second UE context 345 and a third UE context 347.

The SeNB 360b manages and stores UE contexts for the second radio connection 353b for each UE 302 for configured cells 351 for the UE 302. For example, the SeNB 360b may manages and store the first UE context 343b and a fourth UE context 349. An eNB 360 can behave as both MeNB 360a and SeNB 360b. Therefore, the eNB 360 may manage and store UE contexts for UEs 302 connected to a first radio connection 353a and UE contexts for UEs 302 connected to a second radio connection 353b.

In some implementations, the MAC entities 361a-b may have an interface with an RRC entity 359. The RRC entity 359 may receive RRC messages (e.g., RRC connection reconfiguration message, connection control message, handover command, etc.) from a RRC entity (not shown) of the E-UTRAN 333. The RRC entity 359 may also transmit RRC messages (e.g. RRC connection reconfiguration complete message) to the RRC entity (not shown) of the E-UTRAN 333.

Figure 4:
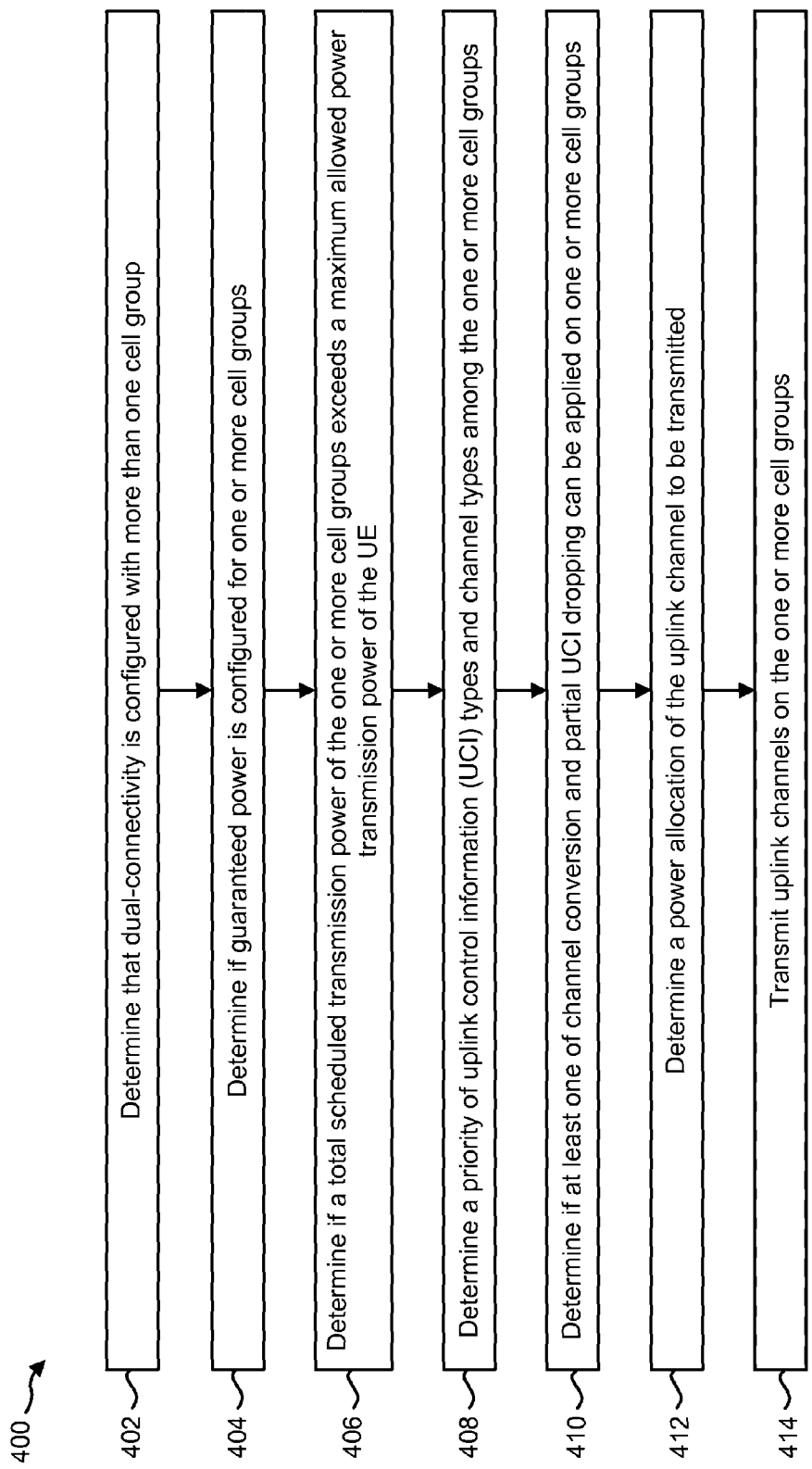
FIG. 4 is a flow diagram illustrating one implementation of a method for dual-connectivity operation by a UE.

FIG. 4 is a flow diagram illustrating one implementation of a method 400 for dual-connectivity operation by a UE 102. In dual-connectivity, a UE 102 may be connected to one or more cell groups. If the UE 102 supports dual-connectivity, the UE 102 may determine 402 that dual-connectivity is configured with more than one cell group. For example, the UE 102 may be connected to an MCG 355 and an SCG 357.

The UE 102 may be able to operate in either a synchronous mode or an asynchronous mode for PUCCH and PUSCH transmissions. In one implementation, the minimum guaranteed power allocation for the secondary eNB 160 (P_SeNB, or $P_{SeNB}$) and/or the minimum guaranteed power allocation for the master eNB 160 (P_MeNB, or $P_{MeNB}$) may be configurable. If the P_SeNB and the P_MeNB are absolute values, then P_SeNB+P_MeNB may be greater than Pcmax, but P_SeNB and P_MeNB may not be greater than the maximum power of the UE power class. If P_SeNB and P_MeNB are ratios of Pcmax, then P_SeNB+P_MeNB may not be greater than one hundred percent of Pcmax. P_SeNB=Pcmax and P_MeNB=Pcmax are allowed, along with P_SeNB+P_MeNB=Pcmax.

In one implementation, the total power allocation of a cell group may be determined by power allocation up to P_SeNB and P_MeNB. The UE 102 may allocate power per each eNB 160 up to the number of P_SeNB or P_MeNB. In another implementation, the power allocated to a cell group may be any remaining power after other cell groups have started transmitting.

The UE 102 may determine 404 if guaranteed power is configured for one or more cell groups (e.g., the MCG 355 and SCG 357). For example, the guaranteed power may be configured for the MCG 355 and not for the SCG 357. This may ensure transmissions made by the MCG 355 are transmitted and transmissions by the SCG 357 may wait until there is enough secondary power to send transmissions.

For the uplink transmissions in a subframe, the UE 102 may determine 406 if a total scheduled transmission power of the UE 102 exceeds the maximum allowed transmission power of the UE 102 (Pcmax). If the total scheduled transmission power of the UE 102 does not exceed the maximum allowed transmission power of the UE 102, then the UE 102 is in a power unlimited case. In this case, simultaneous uplink transmission from the MCG 355 and the SCG 357 may be performed independently according to scheduled uplink transmission powers and existing priority rules within each cell group.

In any portion of a subframe, if the total scheduled transmission power of the cell groups exceeds the maximum allowed transmission power of the UE 102, then the UE 102 is in a power limited case. In a power limited case, if the total uplink transmission powers on the 355 and the SCG 357 exceeds the maximum allowed transmission power of the UE 102, the UE 102 may perform uplink channel prioritization and power scaling on at least one uplink channel so that the total power does not exceed the maximum allowed transmission power of the UE 102. With guaranteed power on each cell group, a cell group is allocated with the guaranteed power first if there is any transmission. The remaining power is then allocated with a priority rule across cell groups. A channel with the lower priority should be dropped or power scaled down before a channel with higher priority The UE 102 may determine 408 a priority of UCI information types and channel types among the one or more cell groups. The UE 102 may determine a priority of UCI types and channel types among the cell groups. Different physical uplink channels 121 and UCI achieve different functions. Thus, different physical uplink channels 121 and UCI have different importance to UE 102 operation.

The physical uplink channels 121 may include a physical random access channel (PRACH) that is used for initial access on a cell. The PRACH may have the highest priority since it is normally the first uplink signal to be transmitted on a cell. If a PRACH is transmitted, the power of a PRACH should not be reduced for simultaneous transmission in a power limited case.

The UCI is feedback control information from the UE 102. The UCI may include one or more of a scheduling request (SR), HARQ-ACK and channel state information (CSI).

The scheduling request (SR) is a signal that may be used for channel access. The SR may have a higher priority than other UCI and channels except for the PRACH, which is not used when an SR resource is available.

HARQ-ACK for PDSCH transmission is used to feedback whether a previous PDSCH is correctly received or not by the UE 102. The CSI is the feedback on the downlink channel conditions so that the eNB 160 can schedule the data transmission more efficiently. The types of CSI may include a rank indication (RI), a precoding matrix indication (PMI) and/or a channel quality indicator (CQI), where CQI may be a wideband CQI and/or a narrow-band CQI. A CSI report may be a periodic CSI or an aperiodic CSI.

A sounding reference signal (SRS) is a signal transmitted on the uplink. The eNB 160 may utilize the SRS to better estimate the uplink channel 121 conditions. The sounding reference signal (SRS) may be used to assist uplink channel estimation.

The PUCCH may be used to carry only UCI. The PUSCH can be used to carry data, and UCI can be multiplexed with data on the PUSCH. In the case where a PUSCH is scheduled by the eNB 160 and there is no data to be transmitted, UCI only may be reported on the PUSCH.

In general, the following priority rules and principles may be applied. These priority rules may also be referred to as dropping rules or channel dropping rules. For the same type of uplink channels 121 or UCI types, the uplink channel 121 on the MCG 355 has higher priority than the uplink channel 121 on the SCG 357 because the MCG 355 is normally used to provide mobility, RRC functionalities and voice services such as SPS transmissions.

Within a cell group, a priority order from high to low of different uplink channels 121 and can be defined as: PRACH, SR, HARQ-ACK, CSI, PUSCH without UCI and SRS.

For the CSI transmission on PUCCH or PUSCH, the same handling of UCI combinations can be used as in Rel-11/12. For example, with the priority order from high to low for RI, PMI, wideband CQI, narrow-band CQI, etc. Aperiodic CSI should have higher priority than periodic CSI since it is requested by the eNB 160 explicitly and normally contains more CSI content and payload size. A PUSCH transmission scheduled by SPS should have higher priority than a PUSCH transmission scheduled by PDCCH or enhanced PDCCH (EPDCCH).

With dual-connectivity, simultaneous PUCCH-transmission on an MCG 355 and an SCG 357 needs to be supported. The information that may be carried on a PUCCH includes the following: SR on format 1a/1b or format 2 or format 3; HARQ-ACK on format 1a/1b or format 2 or format 3; and Periodic CSI on format 2 or format 3.

In one configuration, the PUCCH transmission dropping between two UEs 102 is based on the UCI type. The PUCCH transmission dropping between two UEs 102 may be defined according to the following priority rule: PRACH on MCG>PRACH on SCG>MCG with SR>SCG with SR>MCG with HARQ-ACK>SCG with HARQ-ACK>MCG with periodic RI>SCG with periodic RI>MCG with periodic PMI>SCG with periodic PMI>MCG with periodic wideband CQI>SCG with periodic wideband CQI>MCG with periodic narrowband CQI>SCG with periodic narrowband CQI, where ">" sign indicates the channel/type in front of the ">" sign has higher priority than the channel/type after the ">" sign.

In the above priority rules, the UCI type may be compared across cell groups regardless whether the UCI is carried on a PUCCH or PUSCH. However, in the case of simultaneous HARQ-ACK and CSI on a PUCCH or PUSCH, which priority should be used and how to handle it may be further defined. In one approach, the priority is determined by the information with highest priority. Thus, the lower priority information, such as CSI, may inherit the priority of the higher priority information. Therefore, the priority order may be determined by HARQ-ACK on MCG>HARQ-ACK on SCG>CSI on MCG>CSI>SCG. In another approach, the lower priority information may be dropped by some channel conversion rules, as defined below.

In another configuration, the priority rule may be based only on channel types: PRACH on MCG>PRACH on SCG>PUCCH on MCG>PUCCH on SCG>PUSCH with UCI on MCG>PUSCH with UCI on SCG>PUSCH without UCI on MCG>PUSCH without UCI on SCG>SRS on MCG>SRS on SCG. This priority rule is simpler because it does not consider the UCI types in a channel. For example, a HARQ-ACK transmitted on a PUSCH of one CG will have lower priority than a CQI transmitted on a PUCCH of another CG. This may cause some problems.

The priority for simultaneous PUCCH and PUSCH transmissions may be configured independently. In the case of simultaneous PUCCH and PUSCH transmission on a cell group, the guaranteed power should be applied to the PUCCH first, and the remaining power can be allocated for the PUSCH. For power allocation when simultaneous PUCCH and PUSCH is configured on one cell group or both cell groups, in general, the same priority rules may be applies across the cell groups as described above. For simultaneous PUCCH and PUSCH in a cell group, two combinations are possible for UCI reporting: (1) PUCCH with HARQ-ACK and PUSCH with CSI and (2) PUCCH with CSI and PUSCH with data only.

In the case where simultaneous PUCCH and PUSCH is configured on a cell group and HARQ-ACK is reported on a PUCCH transmission and CSI is reported on a PUSCH transmission, the PUCCH may be the first channel with UCI and the PUSCH is the second channel with UCI. In the case of UCI on PUCCH only or UCI on PUSCH only of a cell group, the PUCCH or PUSCH may be the first channel with UCI on the cell group.

If UCI is reported simultaneously on PUCCH and PUSCH on a first cell group (e.g., CG1), the HARQ-ACK is reported on PUCCH and CSI is reported on a PUSCH. If the other CG (e.g., CG2), also reports CSI on a PUCCH or PUSCH, the priority of the CSI on the other cell group may need to be compared with the CSI of the first cell group on PUSCH. The PUCCH with HARQ-ACK on the first cell group has the highest priority for the remaining power allocation. If guaranteed power is configured on the other cell group, it will apply to the channel with UCI first.

In one approach, the first channel of each UE 102 may be evaluated and allocated power first. For the remaining power, the first channel with UCI on a cell group has a higher priority than the second channel with UCI of another cell group when simultaneous PUCCH and PUSCH is configured. Thus, the channel with UCI on the other cell group (CG2) should have higher priority than the CSI on a PUSCH of the first cell group (CG1) regardless the CSI priority between CG1 and CG2. The remaining power after the guaranteed power of each cell group and the HARQ-ACK PUCCH transmission on CG1 will be allocated to CG2 channel with UCI. For example, if CSI on CG2 is reported on a PUCCH or a PUSCH which is the only channel with UCI on CG2. The channel with CSI on CG2 may have higher priority than the PUSCH with CSI on CG1 where simultaneous PUCCH and PUSCH is configured and HARQ-ACK is reported on PUCCH of CG1. Thus, the PUCCH is considered as the first channel with UCI and the PUSCH with CSI is considered as the second channel with UCI on CG1.

In another approach, the priority rule can be applied also for the CSI type comparison. For example, if CSI on CG2 is reported on a PUCCH or a PUSCH is CQI, and the CSI on PUSCH of CG1 is a RI. The RI should have higher priority than CQI. Thus, the remaining power after the guaranteed power of each CG and the HARQ-ACK PUCCH transmission on CG1 may be allocated for the CSI on PUSCH of CG1 first.

The UE 102 may determine 410 if at least one of channel conversion and partial UCI dropping can be applied on one or more cell groups. In one approach, the UE 102 may determine PRACH power allocation. As discussed above, the PRACH may be used for initial access on a cell. Therefore, the PRACH may have the highest priority on a cell group. The PRACH on the MCG 355 (i.e., the PRACH on MeNB) should have the highest priority. Furthermore, to ensure successful access and a fast response, the transmission power of a PRACH should not be reduced or scaled down. If the minimum guaranteed power for each cell group is configured there different approaches for PRACH transmission on a single cell group.

In a first option for PRACH transmission on a single cell group, the UE 102 may ignore the guaranteed power on the other cell group. With this option, for PRACH transmission on a single cell group, if there is a PRACH transmission on a cell group, the minimum guaranteed power for the other cell group is ignored even if it is configured. Thus, if PRACH is scheduled on an MCG 355, PRACH on the MCG 355 should be transmitted with the scheduled power, and the guaranteed power on the SCG 357 may be compromised even if there is uplink transmission on the SCG 357. Similarly, if PRACH is scheduled on the SCG 357, PRACH on the SCG 357 should be transmitted with the scheduled power, and the guaranteed power on the MCG 355 may be compromised even if there is uplink transmission on the MCG 357.

In a second option for PRACH transmission on a single cell group, the UE 102 may keep the guaranteed power on the other cell group if it has an uplink transmission. With this option, for PRACH transmission on a single cell group, if there is a PRACH transmission on a cell group, the minimum guaranteed power for the other cell group is kept if there is scheduled uplink transmission since the guaranteed power is typically reserved to carry important control information. Thus, if PRACH is scheduled on an MCG 355 and there is uplink transmission on the SCG 357, PRACH on the MCG 355 should be transmitted with the minimum of the requested PRACH power and (Pcmax-PSeNB), where the PSeNB is the guaranteed power on the SCG 357. Similarly, if PRACH is scheduled on the SCG 357 and there is uplink transmission on MCG 355, PRACH on the SCG 357 should be transmitted with the minimum of the requested PRACH power and (Pcmax-PMeNB), where the PMeNB is the guaranteed power on the MCG 355.

With a slight variation to give higher priority on MCG 355, the guaranteed power of the MCG 355 may be reserved if there is uplink transmission, but the guaranteed power on the SCG 357 may be compromised. Thus, if PRACH is scheduled on the MCG 355, PRACH on the MCG 355 should be transmitted with the scheduled power, and the guaranteed power on the SCG 357 may be compromised even if there is uplink transmission on the SCG 357. But, if PRACH is scheduled on the SCG 357 and there is uplink transmission on the MCG 355, PRACH on the SCG 357 should be transmitted with the minimum of the requested PRACH power and (Pcmax-PMeNB), where the PMeNB is the guaranteed power on the MCG 355.

For simultaneous PRACH transmission on both the MCG 355 and the SCG 357, the PRACH on the MCG 355 should have higher priority than the PRACH on the SCG 357. Thus, the PRACH on the MCG 355 should be transmitted with the scheduled power P_PRACH_MCG. The PRACH on the SCG 357 may have two choices. In a first choice, the PRACH on the SCG 357 may be dropped if there is not enough transmit power as requested. In a second choice, the PRACH on the SCG 357 may be power scaled down to fit the power requirement. In other words, the remaining power of (Pcmax-P_PRACH_MCG) may be applied for the PRACH on the SCG 357.

In another approach to determining if at least one of channel conversion and partial UCI dropping can be applied on one or more cell groups, the UE 102 may evaluate an SRS transmission. The sounding reference signal (SRS) may be used to assist uplink channel estimation. In one configuration, the SRS may have the lowest priority in power allocation.

In one option for SRS power allocation, the guaranteed power is not applied to SRS signal. Because an SRS transmission may not be as important as other signals (e.g., a PRACH transmission or other transmission on the UE 102), the UE 102 may not reserve guaranteed power for the SRS on a cell group if the cell group only has an SRS transmission In other words, if the UE 102 only has an SRS transmission, the UE 302 may not reserve guaranteed power for the SRS transmission due to the lower priority of the transmission. In this configuration the SRS transmission may be dropped if there is not enough power for the SRS transmission or the SRS transmission may be transmitted using any remaining power.

In a second option for SRS power allocation, the guaranteed power may also be applied to the SRS signal. For example, the UE 102 may apply the guaranteed power to the SRS transmission even if the cell group only has an SRS transmission. In a power limited case, the SRS signal may be transmitted with the guaranteed power only. It should be noted that the eNB 160 should evaluate if the SRS is transmitted with the expected power or guaranteed power for channel estimation.

In another approach to determining if at least one of channel conversion and partial UCI dropping can be applied on one or more cell groups, the UE 102 may evaluate guaranteed power for PUSCH data-only transmissions. For a PUSCH transmission without UCI, power scaling may be applied since if the PUSCH is not decoded correctly, the PUSCH can be retransmitted with the HARQ process. In some cases, the guaranteed power will be reserved for a cell group even if cell group only has PUSCH data transmission without UCI. However, there are potential issues if another cell group carries more important UCI, but the remaining power on the other cell group is not enough. Thus, the guaranteed power may be allocated for a PUSCH data transmission without UCI.

In one approach, the guaranteed power on each cell group may be reserved for a transmission that contains UCI (e.g., UCI on PUCCH or a PUSCH with UCI). In this approach, if a cell group only has a PUSCH data transmission, the guaranteed power may not be reserved for the cell group.

In another approach, the guaranteed power may be reserved for a transmission with UCI and/or a transmission with only PUSCH data that is scheduled by semi-persistent scheduling (SPS).

In yet another approach, the guaranteed power may be reserved for a PUSCH data-only transmission on an MCG 355. Transmission originating from an MCG 355 may contain important RRC signaling. In this approach, the UE 102 may not reserve guaranteed power for a PUSCH data-only transmission on an SCG 357.

In another approach, the UE 102 may determine UCI dropping and channel conversion for PUCCH and PUSCH transmissions. In one approach, if the guaranteed power is configured on the UE 102 for PUCCH transmission the UE 102 may evaluate if the guaranteed power on the UE 102 is sufficient for the PUCCH transmission. If the guaranteed power is sufficient, the PUCCH transmission may be transmitted with the guaranteed power. If the guaranteed power is not sufficient for the PUCCH transmission, the UE 102 may further evaluate the allocation of power to determine if there is enough available power for the PUCCH transmission.

In another approach, if the guaranteed power is configured for UCI on PUSCH transmission, the UE 102 may evaluate if the guaranteed power on the UE 102 is sufficient for the UCI on PUSCH transmission. If the guaranteed power is sufficient, the UCI on PUSCH transmission may be transmitted with the guaranteed power. If the guaranteed power is not sufficient for the UCI in PUSCH transmission, the UE 102 may further evaluate the allocation of power to determine if there is enough available power for the UCI on PUSCH transmission.

Any power remaining after the allocation of guaranteed power may be allocated based on UCI and priority as discussed above. In one configuration, the power to transmit a UCI on PUCCH transmission may be based on the number of bits in the payload of the transmission. The guaranteed power may be sufficient for certain types of PUCCH transmissions (e.g., HARQ-ACK on PUCCH transmissions). The guaranteed power may not be sufficient for other types of PUCCH transmissions with large payload (e.g., simultaneous HARQ-ACK on PUCCH and CSI on PUCCH transmissions).

When the guaranteed power is insufficient, transmission degradation may occur and special transmission handling may be performed. For example, content on a UCI on PUCCH transmission may not be properly received if transmission power is below requested power for the transmission. The mis-detection of UCI may cause many problems. For example, HARQ-ACK errors may cause a drop of unsuccessful packets or retransmissions of correctly receive packets. An incorrect CSI report may cause bad channel adaptation and MCS setting.

For UCI on PUSCH transmissions, if the required power cannot be satisfied and power scaling is applied, the power of resource elements for UCI and data will be equally scaled down. For data, if it is not correctly received, the HARQ process may trigger a retransmission. For the UCI, no retransmission may be possible. Thus, the UCI may not be able to decode correctly due to lower transmission power. The incorrectly received UCI may cause more harm to the system performance than a dropped UCI. Therefore, for UCI transmission, simple scaling with reduced power is not encouraged. The UE 102 may choose to drop a channel with UCI if the required power cannot be satisfied or is below a threshold. The threshold may be a power ratio of the requested power, or an absolute value of power allocation, or an offset value of the request power (e.g., 3 decibels (dB) below the requested power).

For UCI transmission on PUCCH (especially simultaneous HARQ-ACK and CSI transmissions), if the transmission power is not sufficient, the UE 102 may drop the CSI information and transmit the HARQ-ACK transmission to ensure system operation continues at a high enough level. For simultaneous HARQ-ACK and CSI transmission on PUCCH format 2a/2b, the UE 102 may drop the PUCCH transmission on the periodic CSI PUCCH resource. The UE 102 may transmit HARQ-ACK with PUCCH format 1a/1b on the dynamic HARQ-ACK resource.

For simultaneous HARQ-ACK and CSI transmission on PUCCH format 3, the UE 102 may drop the payload of periodic CSI. The UE 102 may transmit HARQ-ACK with PUCCH format 1a/1b on the dynamic HARQ-ACK resource.

In a power-limited case, UCI on PUSCH may be transmitted with UCI only and the data portion being dropped. The UCI may be reported on PUCCH instead of PUSCH. This approach can be applied together with the guaranteed power on each cell group. A threshold may be applied to UCI on PUSCH power scaling as well. For a UCI transmission on PUSCH, the UE 102 may first evaluate if the remaining power for the PUSCH transmission is above a threshold. If the remaining power for the PUSCH transmission is above the threshold, the PUSCH with UCI can be transmitted with power scaling. However, if the remaining power for the PUSCH transmission is not above the threshold, the UE 102 should evaluate if the remaining power is sufficient for a UCI only on PUSCH transmission. If the remaining power is above a threshold for the UCI-only PUSCH transmission, the UCI only is transmitted on PUSCH.

The UE 102 may also evaluate if the UCI can be reported on PUCCH instead of PUSCH. If so, the UE 102 may choose to report the UCI on PUCCH and drop the PUSCH transmission.

Several different combinations of channel transmission may occur. For a single physical channel in subframe i, a first cell group (CG1) may have a guaranteed power of P1(i), a requested power of P1_req(i), and may carry UCI type 1. CG1 may refer to an MCG 355 or an SCG 357. For the subframe i, another cell group (CG2) may have a guaranteed power of P2(i), a requested power of P2_req(i), and may carry UCI type 2. In the power limited case, $$P1(i)+P2(i) \leq P\text{cmax}(i) \tag{1}$$

$$P1\_req(i)+P2\_req(i) > P\text{cmax}(i). \tag{2}$$

In a first case, PUCCH is on CG1 and PUCCH is on CG2. In this case, UCI on CG1 may be higher priority than UCI on CG2. For uplink transmission in subframe i. Equations (3) and (4) may be used considering the guaranteed power:

$$P\_PUCCH\_CG1(i)=\min(P1\_req(i),P\text{cmax}(i)-P2(i)) \tag{3}$$

$$P\_PUCCH\_CG2(i)=P\text{cmax}(i)-\min(P1\_req(i), P\text{cmax}(i)-P2(i)) \tag{4}$$

In Equation (3), P_PUCCH_CG1(i) is the transmission power of PUCCH for CG1. Where P1(i) is guaranteed power configured for CG1 and P2(i) is the guaranteed power configured for CG2. In Equation (4), P_PUCCH_CG2(i) is the transmission power of PUCCH for CG2. To reduce an incorrect PUCCH detection, if the PUCCH transmission power of a cell group is below a threshold, the PUCCH on that cell group may be dropped. The PUCCH on the other cell group may be transmitted with the min(PUCCH transmission power of the other cell group, Pcmax).

In a second case, PUCCH is on CG1 and PUSCH with UCI is on CG2. If the UCI on CG1 has higher priority than the UCI on CG2 according to the priority rules above, then Equations (5) and (6) may be used to determine the PUCCH and PUSCH transmission power:

$$P\_PUCCH\_CG1(i)=\min(P1\_req(i),P\text{cmax}(i)-P2(i)) \tag{5}$$

$$P\_PUSCH\_CG2(i)=P\text{cmax}(i)-\min(P1\_req(i), P\text{cmax}(i)-P2(i)) \tag{6}$$

In Equation (6), P_PUSCH_CG2(i) is the transmission power of PUSCH for CG2. If the UCI on CG2 has higher priority than the UCI on CG1 according to the priority rules above, then Equations (7) and (8) may be used to determine the PUCCH and PUSCH transmission power:

$$P\_PUCCH\_CG1(i)=P\text{cmax}(i)-\min(P2\_req(i), P\text{cmax}(i)-P1(i)) \tag{7}$$

$$P\_PUSCH\_CG2(i)=\min(P2\_req(i),P\text{cmax}(i)-P1(i)) \tag{8}$$

If the PUCCH transmission power of a cell group is below a threshold, the PUCCH on that cell group may be dropped. The remaining power can be applied to the other cell group. Furthermore, if the P_PUSCH_CG2(i) is below a threshold for power scaling, to avoid unacceptable UCI performance, the UE 102 may choose to transmit UCI only on PUSCH using the remaining power according to Equation (9).

$$P\_PUSCH\_CG2\_UCI(i)=\min(P\_PUSCH\_CG2(i), P\_PUSCH\_CG2\_UCI\_req(i)) \tag{9}$$

In Equation (9), P_PUSCH_CG2_UCI_req(i) is the required power for UCI-only PUSCH transmission to achieve the same power for each resource element based on the requested power for PUSCH transmission (P2_req). If P_PUSCH_CG2_UCI(i) is lower than P_PUSCH_CG2(i), the remaining power may be used on PUCCH on CG1 if P_PUCCH_CG1(i) is smaller than the requested power P1_req(i).

Alternatively, if the P_PUSCH_CG2(i) is below a threshold for power scaling, to avoid unacceptable UCI performance, the UE 102 may choose to transmit UCI on PUCCH and drop the PUSCH transmission. In this case, the same power allocation method as in the first case should be applied, and the transmission power should be recalculated accordingly.

In a third case, PUCCH is on CG1 and PUSCH without UCI is on CG2. Since the PUCCH carries UCI and has a higher priority than PUSCH without UCI, the power may be allocated according to Equations (10) and (11).

$$P\_PUCCH\_CG1(i)=\min(P1\_req(i), P\text{cmax}(i)-P2(i)) \quad (10)$$

$$P\_PUSCH\_CG2(i)=P\text{cmax}(i)-\min(P1\_req(i), P\text{cmax}(i)-P2(i)) \quad (11)$$

In another approach for the third case, the guaranteed power of PUSCH without UCI can be removed. In this approach, the power may be allocated according to Equations (12) and (13).

$$P\_PUCCH\_CG1(i)=\min(P1\_req(i), P\text{cmax}(i)) \quad (12)$$

$$P\_PUSCH\_CG2(i)=P\text{cmax}(i)-\min(P1\_req(i), P\text{cmax}(i)) \quad (13)$$

In a fourth case, PUSCH with UCI is on CG1 and PUSCH with UCI is on CG2. The UCI on CG1 may have higher priority than the UCI on CG2. In this case, for uplink transmissions in subframe i, Equations (14) and (15) may be used to allocate transmission power considering the guaranteed power.

$$P\_PUSCH\_CG1(i)=\min(P1\_req(i), P\text{cmax}(i)-P2(i)) \quad (14)$$

$$P\_PUSCH\_CG2(i)=P\text{cmax}(i)-\min(P1\_req(i), P\text{cmax}(i)-P2(i)) \quad (15)$$

If the P_PUSCH_CGx(i) is below a threshold for power scaling, to avoid unacceptable UCI performance, the UE 102 may choose to transmit UCI only on PUSCH using the remaining power according to Equation (16).

$$P\_PUSCH\_CGx\_UCI(i)=\min(P\_PUSCH\_CGx(i), P\_PUSCH\_CGx\_UCI\_req(i)) \quad (16)$$

In Equation (16), P_PUSCH_CGx_UCI_req(i) is the required power for UCI-only PUSCH transmission to achieve the same power for each resource element based on the requested power for PUSCH transmission Px_req for CGx, CGx may be CG1 or CG2. If P_PUSCH_CGx_UCI(i) is lower than P_PUSCH_CGx(i), the remaining power may be used on the transmission of the other cell group as needed.

Alternatively, if the P_PUSCH_CGx(i) is below a threshold for power scaling, to avoid unacceptable UCI performance, the UE 102 may choose to transmit UCI on PUCCH and drop the PUSCH transmission. In this case, the same power allocation approach as in the first case and the second case should be applied, and the transmission power should be recalculated accordingly. If after channel conversion, the PUCCH transmission power of a cell group is still below a threshold, the PUCCH on that cell group may be dropped, and the remaining power can be applied to the other cell group.

In a fifth case, PUSCH with UCI is on CG1 and PUSCH without UCI is on CG2. Since PUSCH with UCI has higher priority than PUSCH without UCI, the power may be allocated according to Equations (17) and (18).

$$P\_PUSCH\_CG1(i)=\min(P1\_req(i), P\text{cmax}(i)-P2(i)) \quad (17)$$

$$P\_PUSCH\_CG2(i)=P\text{cmax}(i)-\min(P1\_req(i), P\text{cmax}(i)-P2(i)) \quad (18)$$

In another approach for the fifth case, the guaranteed power of PUSCH without UCI can be removed. In this approach, the power may be allocated according to Equations (19) and (20).

$$P\_PUSCH\_CG1(i)=\min(P1\_req(i), P\text{cmax}(i)) \quad (19)$$

$$P\_PUSCH\_CG2(i)=P\text{cmax}(i)-\min(P1\_req(i), P\text{cmax}(i)) \quad (20)$$

In a sixth case, PUSCH without UCI is on CG1 and PUSCH without UCI is on CG2. Since an MCG 355 carries important RRC information, the PUSCH on the MCG 355 may have higher priority than an SCG 357. Thus, is CG1 is and MCG 355, power may be allocated according to Equations (21) and (22)

$$P\_PUSCH\_CG1(i)=\min(P1\_req(i), P\text{cmax}(i)-P2(i)) \quad (21)$$

$$P\_PUSCH\_CG2(i)=P\text{cmax}(i)-\min(P1\_req(i), P\text{cmax}(i)-P2(i)) \quad (22)$$

This power allocation may result in different power scaling factors for different cell groups. However, if there are multiple PUSCH transmissions in a single cell group, the same power scaling may be applied to all serving cells carrying PUSCH according to Equation (23).

$$P\_PUSCH\_CGx(i) = \sum_c w(i) \cdot \hat{P}_{PUSCH,c}(i) \quad (23)$$

In another approach to the sixth case, the guaranteed power of PUSCH without UCI can be removed. In this approach, the power may be allocated according to Equations (24) and (25).

$$P\_PUSCH\_CG1(i)=\min(P1\_req(i), P\text{cmax}(i)) \quad (24)$$

$$P\_PUSCH\_CG2(i)=P\text{cmax}(i)-\min(P1\_req(i), P\text{cmax}(i)) \quad (25)$$

The UE 102 may determine 412 a power allocation of the uplink channel to be transmitted. The UE 102 may evaluate requested power for each different transmission and determine if the available power, guaranteed power or remaining power, is sufficient for the transmission to be performed. For power allocation, the first channel of each cell group should be evaluated and power allocated first. For the remaining power, the first channel with UCI on a cell group has higher priority than the second channel with UCI of another cell group when simultaneous PUCCH and PUSCH is configured. The UE 102 may transmit 414 uplink channels on the one or more cell groups.

Figure 5:
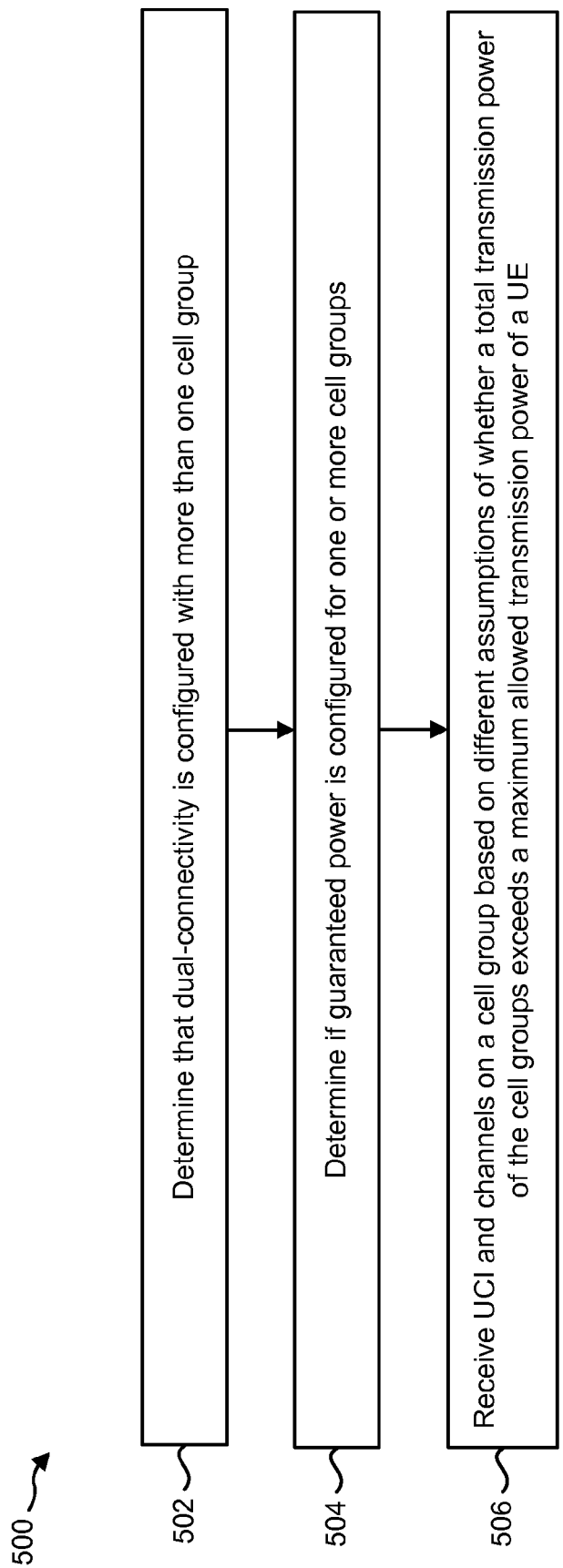
FIG. 5 is a flow diagram illustrating one implementation of a method for dual-connectivity operation by an eNB.

FIG. 5 is a flow diagram illustrating one implementation of a method 500 for dual-connectivity operation by an eNB 160. In dual-connectivity, an eNB 160 may provide multiple cells 351 for connection to one or more UEs 102. The eNB 160 may provide a radio connection 353 for the one or more cells 351. The one or more cells 351 may form a cell group. If the eNB 160 supports dual-connectivity, the eNB 160 may determine 502 that dual-connectivity is configured with more than one cell group. For example, the eNB 160 may provide one cell group and another eNB 160 may provide a second cell group. The cell group may be an MCG 355 or an SCG 357. The eNB may then determine 504 if guaranteed power is configured for one or more cell groups.

The eNB 160 may determine 504 if a guaranteed power is configured for one or more cell group for the UE 102. If a cell group is configured with a minimum guaranteed power, then the UE 102 may reserve a certain amount of power for the other cell group for a potential uplink transmission on the other cell group.

The eNB 160 may receive 506 UCI and channels on a cell group based on different assumptions of whether a total scheduled transmission power of the cell groups exceeds a maximum allowed transmission power of a UE 102 (Pcmax). If the total scheduled transmission power of the cell groups does not exceed the maximum allowed transmission power of the UE 102, then the UE 102 is in a power unlimited case. In this case, the eNB 160 may receive simultaneous uplink transmission from the MCG 355 and the SCG 357 independently. The eNB 160 may expect to receive the uplink channels 121 on the cell group with the scheduled power.

If the total scheduled transmission power of the cell groups exceeds the maximum allowed transmission power of the UE 102, then the UE 102 is in a power-limited case. In this case, if the total uplink transmission powers on the one or more cell groups exceeds the maximum allowed transmission power of the UE 102, the eNB 160 may receive 506 UCI and/or channels based on uplink channel prioritization and power scaling on one or both uplink channels 121 so that the total transmission power is within the power limit. The eNB 160 may receive 506 the UCI and/or channels for a cell group based on the priority rules described above in connection with FIG. 4. Thus, the eNB 160 may expect that some of the scheduled uplink transmissions or channels are dropped or transmitted with reduced power.

The eNB 160 may also receive 506 UCI and channels on a cell group based on whether UCI is scheduled to be carried on a PUSCH transmission for the cell group. For PUSCH transmissions, a PUSCH with UCI may be prioritized over a PUSCH without UCI. Therefore, in a power-limited case, the eNB 160 may expect that the PUSCH without UCI may be dropped or power scaled before the PUSCH with UCI within each cell group.

The eNB 160 may further receive 506 UCI and channels on a cell group based on simultaneous HARQ-ACK and CSI being configured on a cell group. If simultaneous HARQ-ACK and CSI is configured on a first cell group, and if total transmission power of all cell groups with HARQ-ACK only on a PUCCH of the first cell group does not exceed the maximum allowed transmission power of the UE 102, the eNB 160 may receive the HARQ-ACK only on PUCCH and drop the CSI of the first cell group.

The eNB 160 may receive 506 UCI and channels on a cell group based on simultaneous PUCCH and PUSCH transmission being configured on a cell group. If UCI is carried on a PUSCH transmission for a first cell group, and if total transmission power of all cell groups with UCI on a PUCCH of the first cell group does not exceed the maximum allowed transmission power of the UE 102, the eNB 160 may receive the UCI only on PUCCH and drop the PUSCH transmission of the first cell group.

Figure 6:
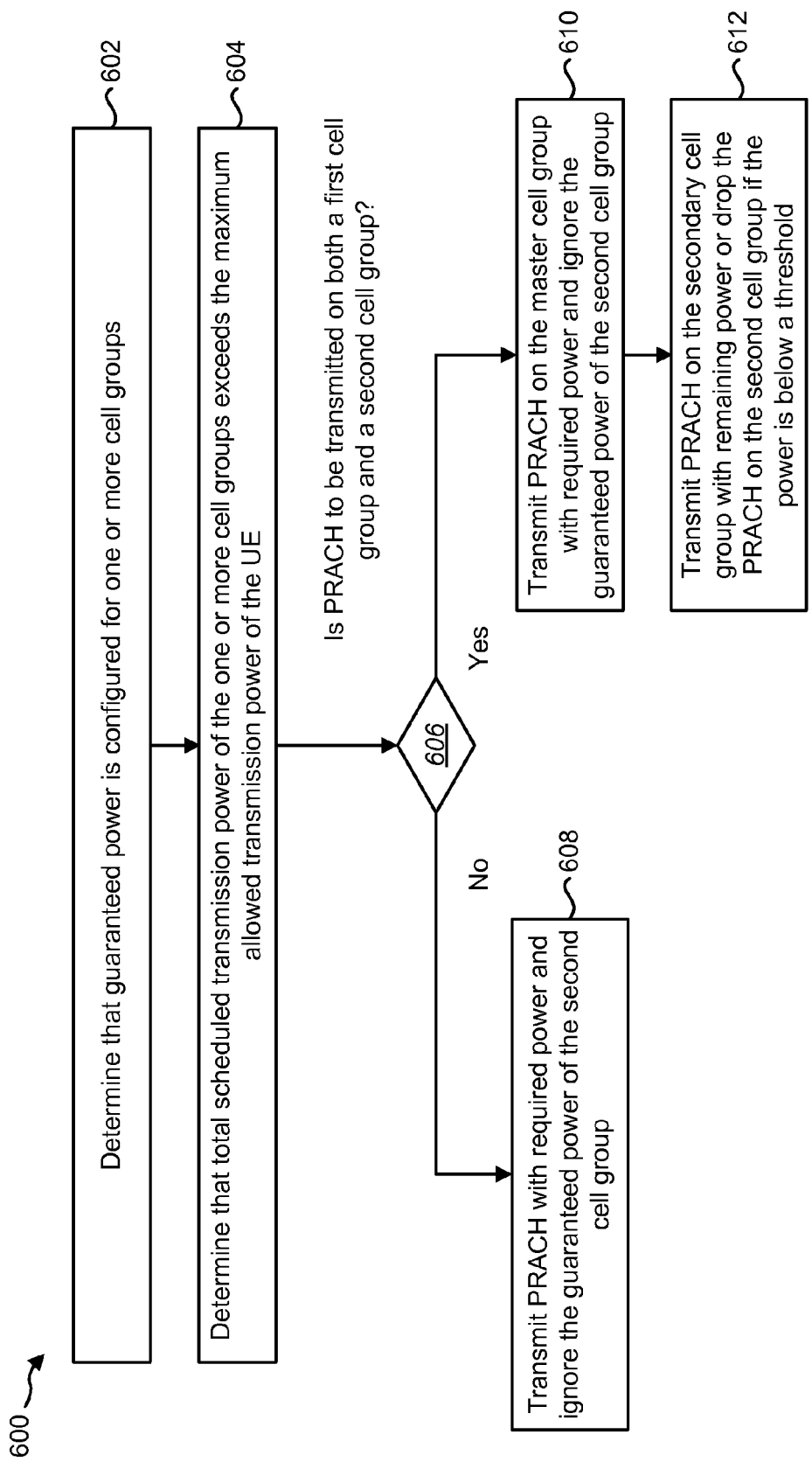
FIG. 6 is a flow diagram illustrating a detailed implementation of a method for physical random access channel (PRACH) power allocation in dual-connectivity operation.

FIG. 6 is a flow diagram illustrating a detailed implementation of a method 600 for PRACH power allocation in dual-connectivity operation. The method 600 may be implemented by a UE 102.

The UE 102 may determine 602 that guaranteed power is configured for one or more cell groups. If a cell group is configured with a minimum guaranteed power, then the UE 102 may reserve a certain amount of power for the other cell group for a potential uplink transmission on the other cell group.

The UE 102 may determine 604 if a total scheduled transmission power of the one or more cell groups exceeds a maximum power. If the total scheduled transmission power of the cell exceeds the maximum allowed transmission power of the UE 102, then the UE 102 is in a power limited case.

The UE 102 may determine 606 if a PRACH is to be transmitted on both a first cell group and a second cell group. If the PRACH is not to be transmitted on both cell groups the UE 102 may then transmit 608 the PRACH with required power and ignore the guaranteed power of the second cell group. This approach may ensure that the transmissions made on the first cell group have sufficient power.

If the UE 102 determines 606 that PRACH is to be transmitted on both a first cell group and a second cell group, e.g. on both MCG 355 and SCG 357, then the UE 102 may transmit 610 PRACH on the MCG 355 with required power and ignore the guaranteed power of the SCG 357. This approach may be used to ensure proper PRACH transmission on the MCG 355 by ignoring the guaranteed power of the SCG 357, even if it is configured. The UE 102 may then transmit 612 the PRACH transmission on the SCG 357 with any remaining power that is not being used by the MCG 355. The UE 102 may also drop the PRACH transmission on the SCG 357 if the power is below a threshold to properly transmit the PRACH transmission.

Figure 7:
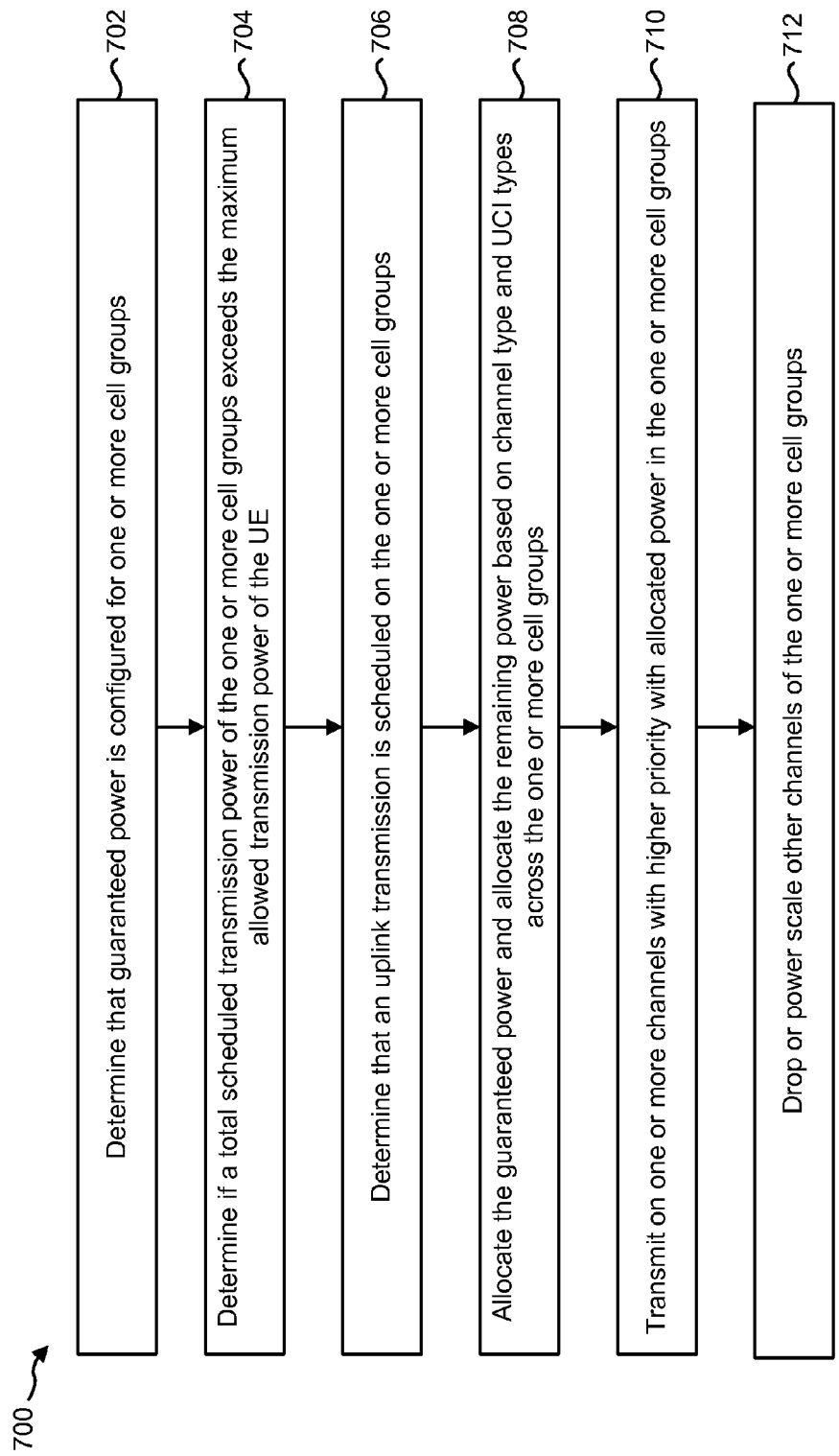
FIG. 7 is a flow diagram illustrating a detailed implementation of a method for dual-connectivity operation by a UE.

FIG. 7 is a flow diagram illustrating a detailed implementation of a method 700 for dual-connectivity operation by a UE 102. The UE 102 may determine 702 that guaranteed power is configured for one or more cell groups. If a cell group is configured with a minimum guaranteed power, then the UE 102 may reserve a certain amount of power for the other cell group for a potential uplink transmission on the other cell group The UE 102 may determine 704 if a total scheduled transmission power of the one or more cell groups exceeds a maximum power. If the total scheduled transmission power of the cell groups exceeds the maximum allowed transmission power of the UE 102, then the UE 102 is in a power limited case.

The UE 102 may determine 706 that an uplink transmission is scheduled on one or more cell groups. This transmission may be a PUCCH transmission, PUSCH transmission, PRACH transmission, etc.

The UE 102 may then allocate 708 the guaranteed power and remaining power based on channel type and UCI types across the one or more cell groups. This allocation may be done as described in connection with FIG. 4.

The allocated power may be used for the UE 102 to transmit 710 on one or more channels with higher priority in the one or more cell groups. The UE 102 may then drop 712 or power scale other channels of the one or more cell groups based on priority or power levels. This may be accomplished as described in connection with FIG. 4.

Figure 8:
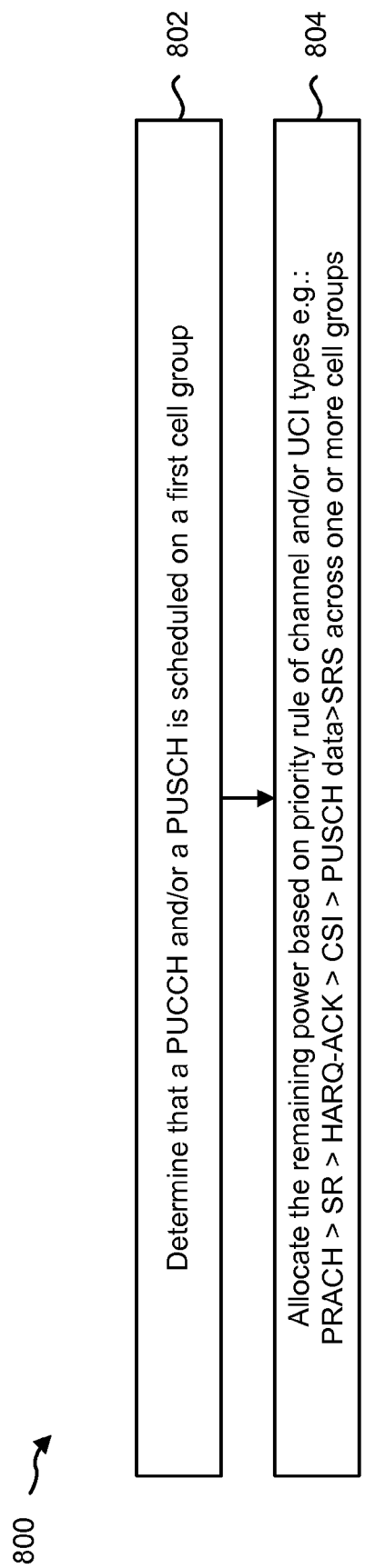
FIG. 8 is a flow diagram illustrating a method for allocating power in dual-connectivity operation according to priority rules.

FIG. 8 is a flow diagram illustrating a method 800 for allocating power in dual-connectivity operation according to priority rules. The method 800 may be implemented by a UE 102. The UE 102 may determine 802 that a PUCCH and/or PUSCH transmission is scheduled on a first cell group.

The UE 102 may allocate 804 remaining power based on a priority rule. The priority rule may be based on channel and/or UCI type: PRACH>SR>HARQ-ACK>CSI>PUSCH data>SRS. In other words, the UE 102 may allocate transmission power that is not used by the first cell group to other cell groups based on the priority rules. The remaining power may be allocated across one or more cell groups.

Figure 9:
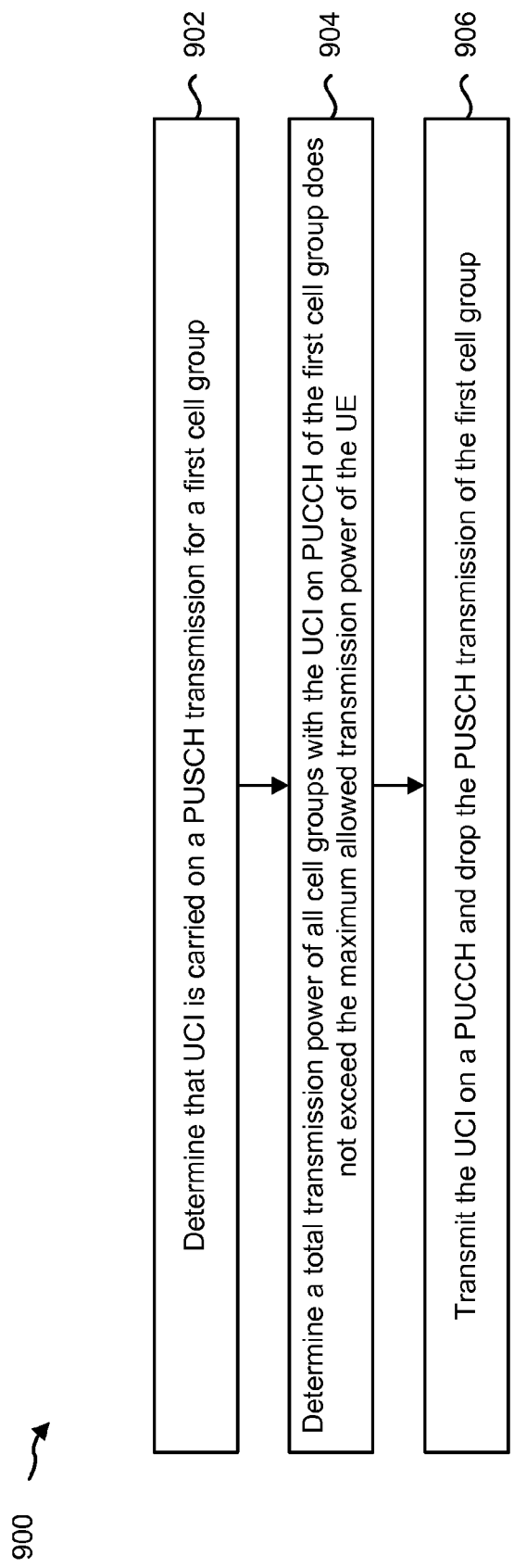
FIG. 9 is a flow diagram illustrating another detailed implementation of a method for dual-connectivity operation by a UE.

FIG. 9 is a flow diagram illustrating another detailed implementation of a method 900 for dual-connectivity operation by a UE 102. The UE 102 may determine 902 that UCI is carried on a PUSCH transmission for a first cell group. The UE 102 may then determine 904 that the total transmission power of all cell groups with the UCI on PUCCH of the first cell group does not exceed the maximum allowed transmission power of the UE 102.

In one configuration, if the total transmission power of all cell groups with a UCI on PUCCH transmission on the first cell group is less than the maximum allowed transmission power of the UE 102, then the UE 102 may transmit UCI on PUCCH in a UCI-only PUCCH report. The UE 102 may perform further power scaling for the PUSCH data transmission.

If the total transmission power with UCI on PUCCH transmission still exceeds the maximum allowed transmission power of the UE 102, the UE 102 may transmit 906 UCI and channels based on the priority rules described above. The UE 102 may then transmit 906 the UCI on a PUCCH and drop the PUSCH transmission of the first cell group.

Figure 10:
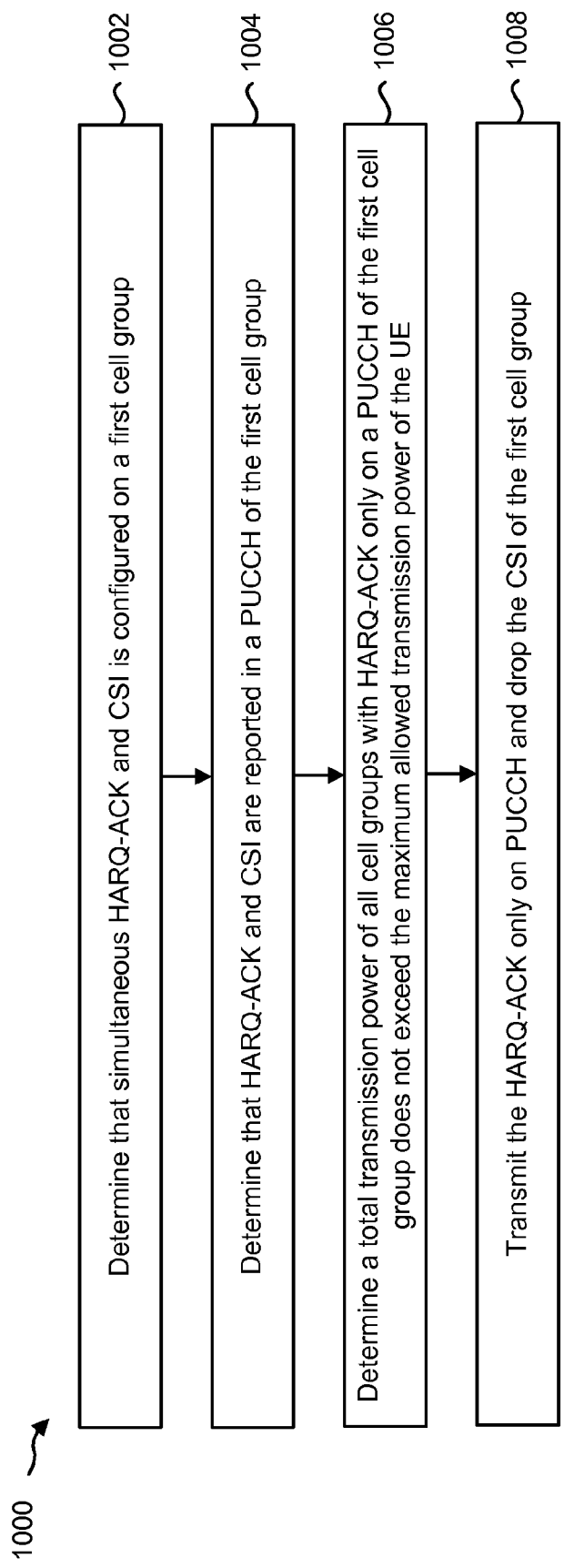
FIG. 10 is a flow diagram illustrating yet another detailed implementation of a method for dual-connectivity operation by a UE.

FIG. 10 is a flow diagram illustrating yet another detailed implementation of a method 1000 for dual-connectivity operation by a UE 102. The UE 102 may determine 1002 that simultaneous HARQ-ACK and CSI is configured on a first cell group. The priority of a HARQ-ACK transmission and the CSI transmission may be HARQ-ACK>CSI. The first cell group may be an MCG 355 or an SCG 357. The UE 102 may determine 1004 that HARQ-ACK and CSI are reported in a PUCCH on the first cell group.

The UE 102 may then determine 1006 that a total transmission power of all cell groups with HARQ-ACK only on a PUCCH of the first cell group does not exceed the maximum allowed transmission power of the UE 102. If the total transmission power of all cell groups with a HARQ-ACK on a PUCCH transmission on the first cell group is less than the maximum allowed transmission power of the UE 102, the UE 102 may transmit 1008 HARQ-ACK on the PUCCH. The UE 102 may perform further power scaling for the PUSCH data transmission. If the total transmission power with HARQ-ACK on PUCCH transmission still exceeds the maximum allowed transmission power of the UE 102, the UE 102 may transmit HARQ-ACK and channels based on the priority rules described above. The UE 102 may then transmit the HARQ-ACK on a PUCCH and drop the CSI transmission of the first cell group.

Figure 11:
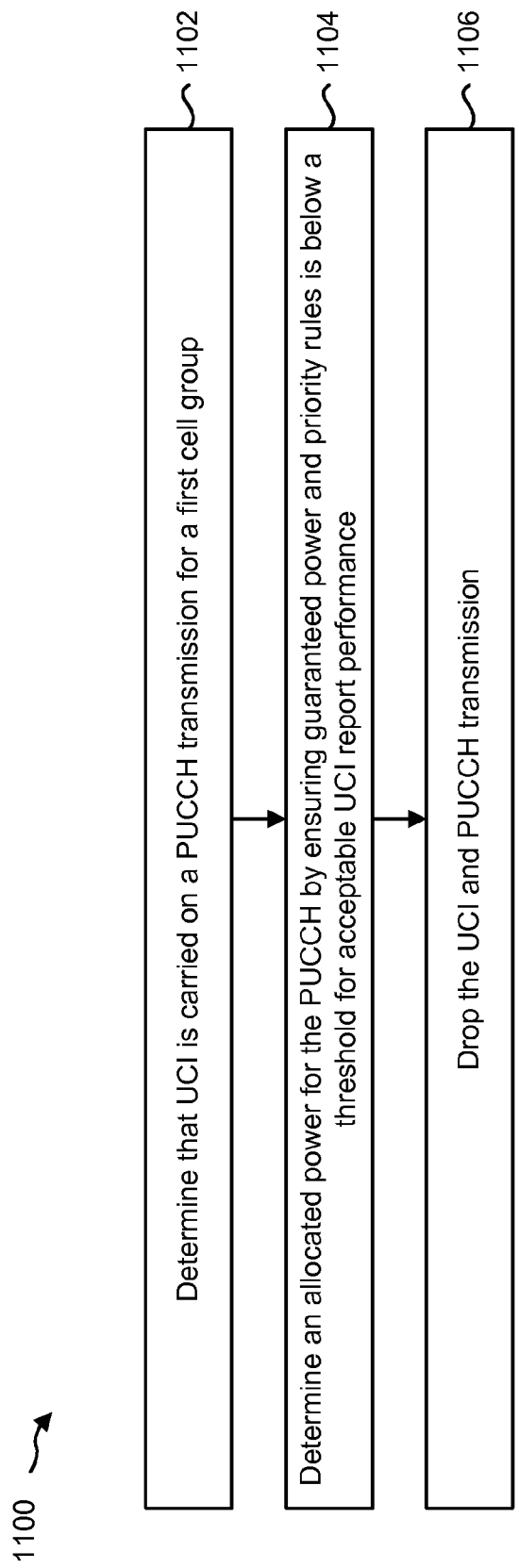
FIG. 11 is a flow diagram illustrating another detailed implementation of a method for dual-connectivity operation by a UE.

FIG. 11 is a flow diagram illustrating another detailed implementation of a method 1100 for dual-connectivity operation by a UE 102. The UE 102 may determine 1102 that UCI is carried on a PUCCH transmission for a first cell group. The UE 102 may then determine 1104 an allocated power for the PUCCH by ensuring guaranteed power and priority rule is below a threshold for acceptable UCI reporting.

The UE 102 may drop 1106 the UCI and PUCCH transmission when the allocated power for the UCI and PUCCH transmission is below the threshold for acceptable UCI reporting. An improperly received UCI may be more detrimental to system performance than a dropped UCI. Therefore, power scaling a transmission that contains UCI may be less desirable. In one configuration, sufficient power for a UCI transmission may be a power ratio of the requested power, or an absolute value of power allocation. In another configuration, sufficient power for a UCI transmission may be an offset value of the requested power e.g. 3 dB below the requested power.

Figure 12:
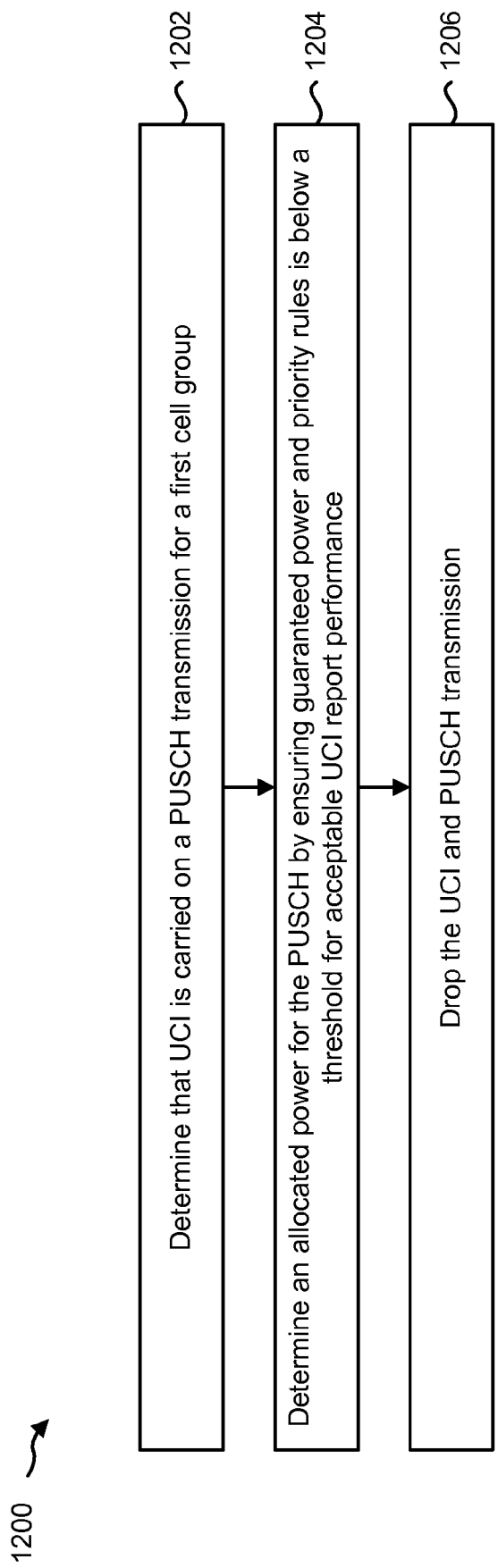
FIG. 12 is a flow diagram illustrating yet another detailed implementation of a method for dual-connectivity operation by a UE.

FIG. 12 is a flow diagram illustrating yet another detailed implementation of a method 1200 for dual-connectivity operation by a UE 102. The UE 102 may determine 1202 that UCI is carried on a PUSCH transmission for a first cell group. The UE 102 may then determine 1204 that an allocated power for the PUSCH by ensuring guaranteed power and priority rules is below a threshold for acceptable UCI reporting.

The UE 102 may drop 1206 the UCI and PUSCH transmission when the allocated power for the UCI and PUSCH transmission is below the threshold for acceptable UCI reporting. An improperly received UCI may be more detrimental to system performance than a dropped UCI. Therefore, power scaling a transmission that contains UCI may be less desirable. In one configuration, sufficient power for a UCI transmission may be a power ratio of the requested power, or an absolute value of power allocation. In another configuration, sufficient power for a UCI transmission may be an offset value of the requested power. For example, the offset value of the requested power may be 3 decibels (dB) below the requested power.

Figure 13:
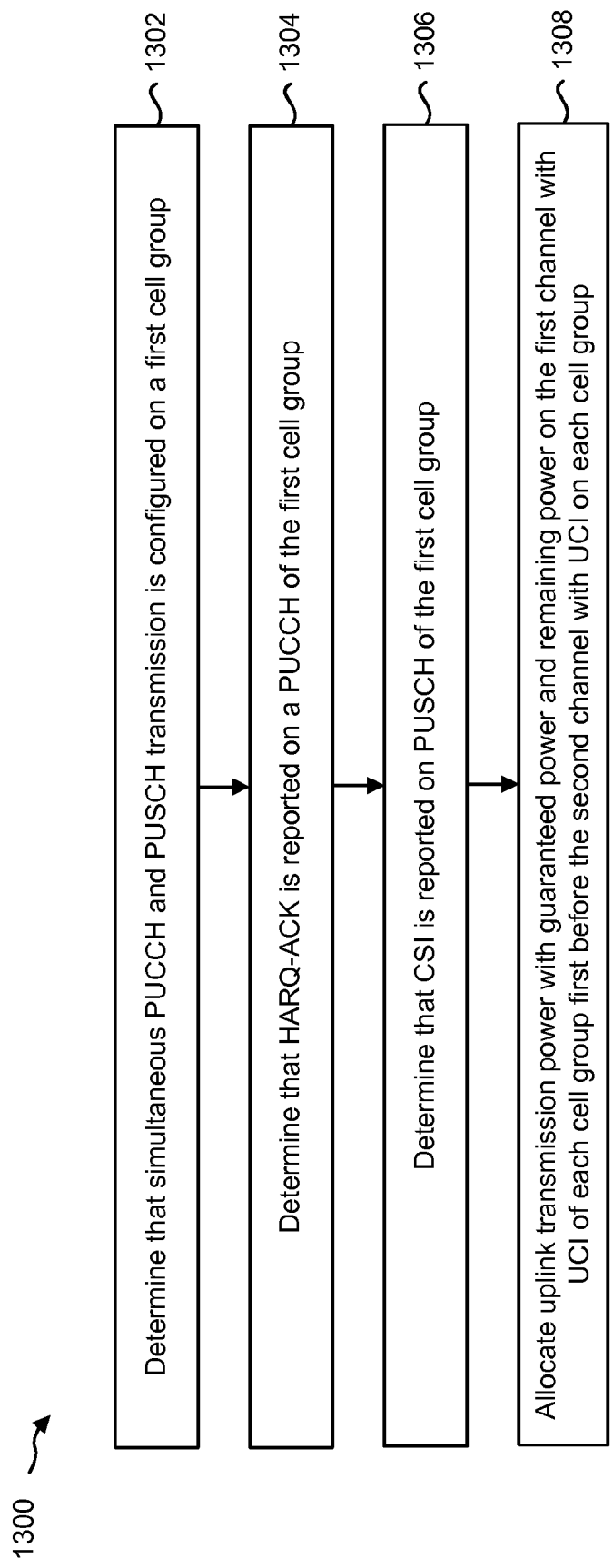
FIG. 13 is a flow diagram illustrating yet another detailed implementation of a method for dual-connectivity operation by a UE.

FIG. 13 is a flow diagram illustrating another detailed implementation of a method 1300 for dual-connectivity operation by a UE 102. The UE 102 may determine 1302 that simultaneous PUCCH and PUSCH transmission is configured on a first cell group. The UE 102 may determine 1304 that HARQ-ACK is reported on a PUCCH of the first cell group. The UE 102 may determine 1306 that CSI is reported on PUSCH of the first cell group.

Priority for simultaneous PUCCH and PUSCH transmissions may be configured independently. The UE 102 may allocate 1308 uplink transmission power with guaranteed power. The UE 102 may allocate 1308 remaining power on the first channel with UCI of each cell group first before the second channel with UCI on each cell group. The PUCCH may be the first channel with UCI and the PUSCH may be the second channel with UCI if HARQ-ACK is reported on PUCCH and CSI is reported on a PUSCH of the first cell group if simultaneous PUCCH and PUSCH transmission is configured. The PUCCH or PUSCH with UCI may be the first channel with UCI of the cell group if simultaneous PUCCH and PUSCH transmission is not configured.

Figure 14:
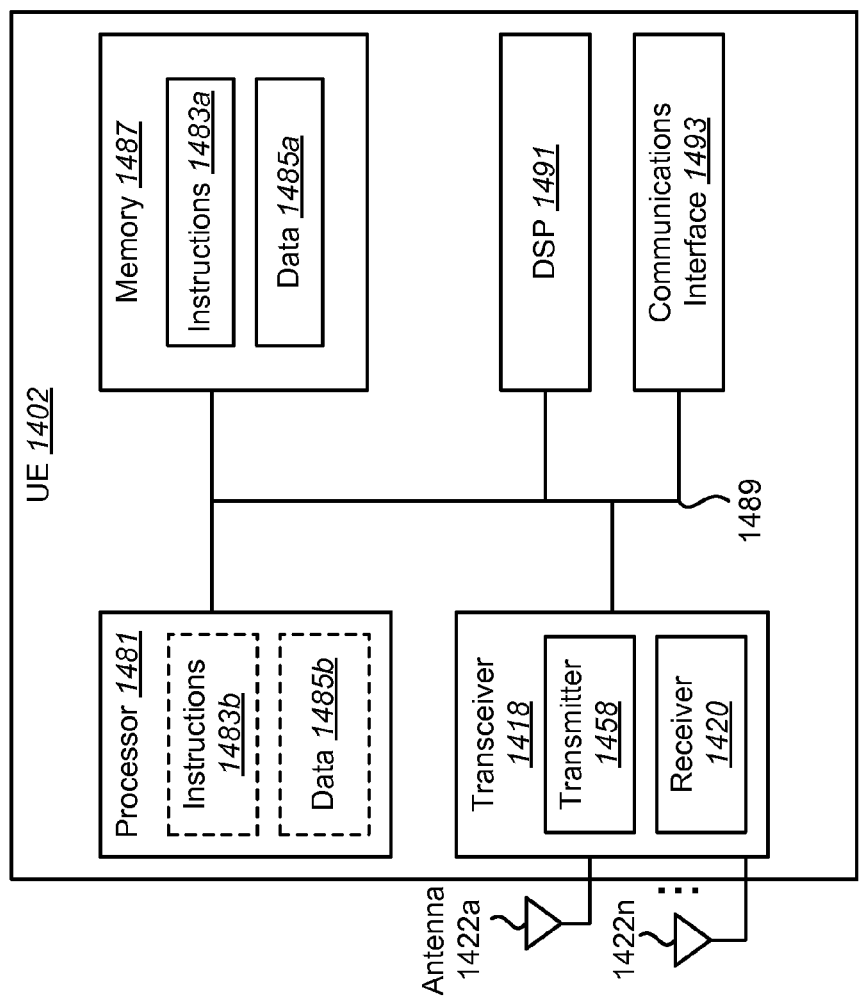
FIG. 14 illustrates various components that may be utilized in a UE.

FIG. 14 illustrates various components that may be utilized in a UE 1402. The UE 1402 described in connection with FIG. 14 may be implemented in accordance with the UE 102 described in connection with FIG. 1. The UE 1402 includes a processor 1481 that controls operation of the UE 1402. The processor 1481 may also be referred to as a central processing unit (CPU). Memory 1487, which may include read-only memory (ROM), random access memory (RAM), a combination of the two or any type of device that may store information, provides instructions 1483a and data 1485a to the processor 1481. A portion of the memory 1487 may also include non-volatile random access memory (NVRAM). Instructions 1483b and data 1485b may also reside in the processor 1481. Instructions 1483b and/or data 1485b loaded into the processor 1481 may also include instructions 1483a and/or data 1485a from memory 1487 that were loaded for execution or processing by the processor 1481. The instructions 1483*b* may be executed by the processor 1481 to implement one or more of the methods 400, 600, 700, 800, 900, 1000, 1100, 1200 and 1300 described above.

The UE 1402 may also include a housing that contains one or more transmitters 1458 and one or more receivers 1420 to allow transmission and reception of data. The transmitter(s) 1458 and receiver(s) 1420 may be combined into one or more transceivers 1418. One or more antennas 1422*a-n* are attached to the housing and electrically coupled to the transceiver 1418.

The various components of the UE 1402 are coupled together by a bus system 1489, which may include a power bus, a control signal bus and a status signal bus, in addition to a data bus. However, for the sake of clarity, the various buses are illustrated in FIG. 14 as the bus system 1489. The UE 1402 may also include a digital signal processor (DSP) 1491 for use in processing signals. The UE 1402 may also include a communications interface 1493 that provides user access to the functions of the UE 1402. The UE 1402 illustrated in FIG. 14 is a functional block diagram rather than a listing of specific components.

Figure 15:
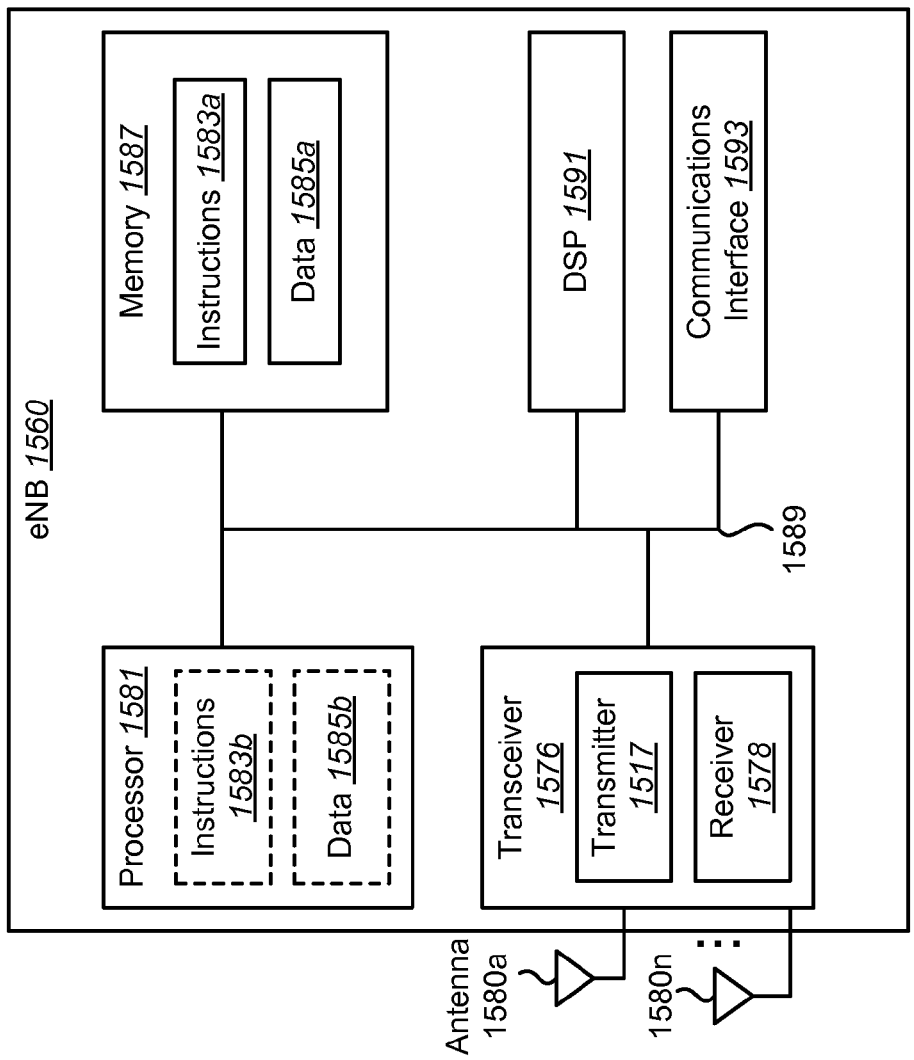
FIG. 15 illustrates various components that may be utilized in an eNB.

FIG. 15 illustrates various components that may be utilized in an eNB 1560. The eNB 1560 described in connection with FIG. 15 may be implemented in accordance with the eNB 160 described in connection with FIG. 1. The eNB 1560 includes a processor 1581 that controls operation of the eNB 1560. The processor 1581 may also be referred to as a central processing unit (CPU). Memory 1587, which may include read-only memory (ROM), random access memory (RAM), a combination of the two or any type of device that may store information, provides instructions 1583*a* and data 1585*a* to the processor 1581. A portion of the memory 1587 may also include non-volatile random access memory (NVRAM). Instructions 1583*b* and data 1585*b* may also reside in the processor 1581. Instructions 1583*b* and/or data 1585*b* loaded into the processor 1581 may also include instructions 1583*a* and/or data 1585*a* from memory 1587 that were loaded for execution or processing by the processor 1581. The instructions 1583*b* may be executed by the processor 1581 to implement the method 500 described above.

The eNB 1560 may also include a housing that contains one or more transmitters 1517 and one or more receivers 1578 to allow transmission and reception of data. The transmitter(s) 1517 and receiver(s) 1578 may be combined into one or more transceivers 1576. One or more antennas 1580*a-n* are attached to the housing and electrically coupled to the transceiver 1576.

The various components of the eNB 1560 are coupled together by a bus system 1589, which may include a power bus, a control signal bus and a status signal bus, in addition to a data bus. However, for the sake of clarity, the various buses are illustrated in FIG. 15 as the bus system 1589. The eNB 1560 may also include a digital signal processor (DSP) 1591 for use in processing signals. The eNB 1560 may also include a communications interface 1593 that provides user access to the functions of the eNB 1560. The eNB 1560 illustrated in FIG. 15 is a functional block diagram rather than a listing of specific components.

Figure 16:
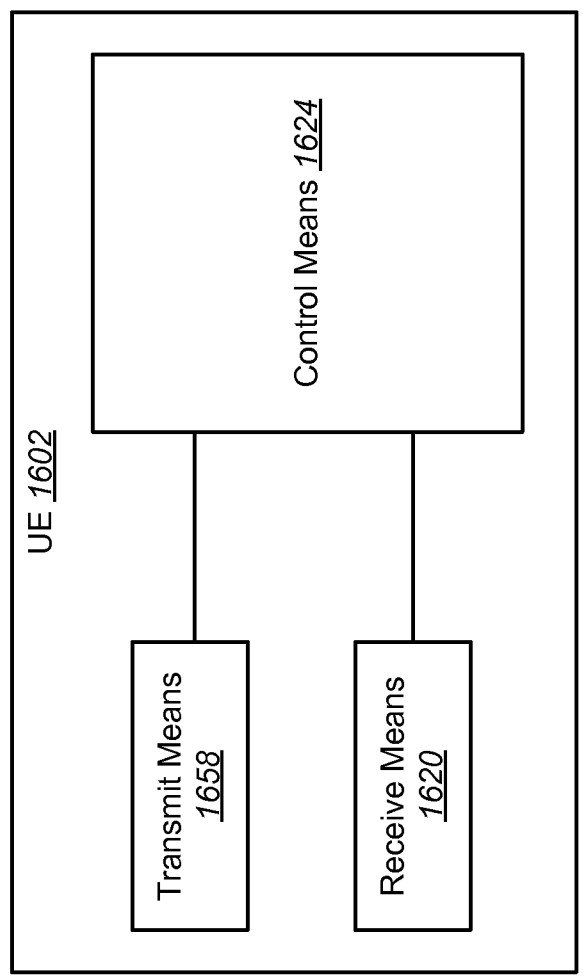
FIG. 16 is a block diagram illustrating one configuration of a UE in which systems and methods for sending feedback information may be implemented.

FIG. 16 is a block diagram illustrating one configuration of a UE 1602 in which systems and methods for sending feedback information may be implemented. The UE 1602 includes transmit means 1658, receive means 1620 and control means 1624. The transmit means 1658, receive means 1620 and control means 1624 may be configured to perform one or more of the functions described in connection with FIG. 4, FIG. 6, FIG. 7, FIG. 8, FIG. 9, FIG. 10, FIG. 11, FIG. 12 and FIG. 13.

FIG. 14 above illustrates one example of a concrete apparatus structure of FIG. 16. Other various structures may be implemented to realize one or more of the functions of FIG. 4, FIG. 6, FIG. 7, FIG. 8, FIG. 9, FIG. 10, FIG. 11, FIG. 12 and FIG. 13. For example, a DSP may be realized by software.

Figure 17:
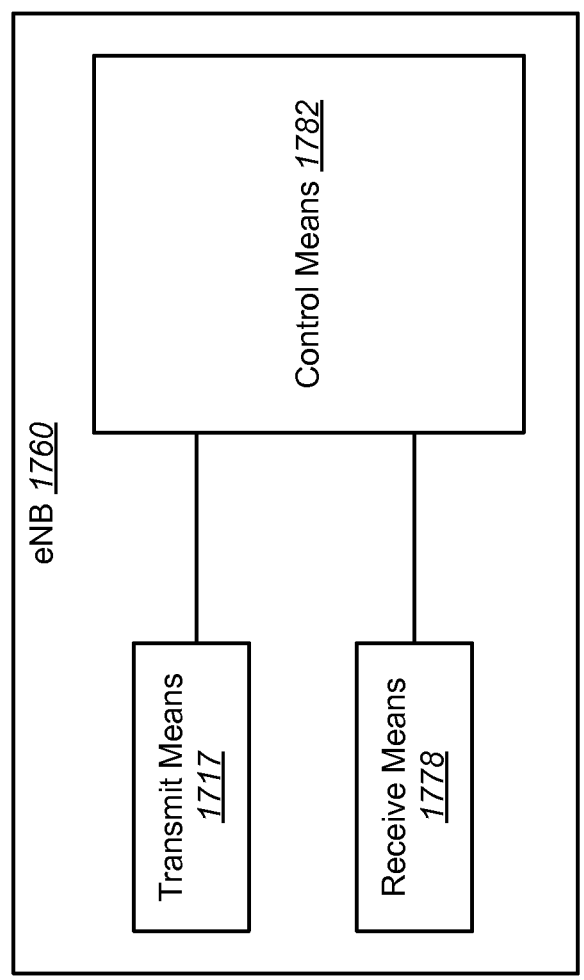
FIG. 17 is a block diagram illustrating one configuration of an eNB in which systems and methods for receiving feedback information may be implemented.

FIG. 17 is a block diagram illustrating one configuration of an eNB 1760 in which systems and methods for receiving feedback information may be implemented. The eNB 1760 includes transmit means 1717, receive means 1778 and control means 1782. The transmit means 1717, receive means 1778 and control means 1782 may be configured to perform one or more of the functions described in connection with FIG. 5 above. FIG. 15 above illustrates one example of a concrete apparatus structure of FIG. 17. Other various structures may be implemented to realize one or more of the functions of FIG. 5. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A user equipment (UE), comprising:
   a processor; and
   memory in electronic communication with the processor, wherein instructions stored in the memory are executable to:
   configure a master cell group (MCG) and a secondary cell group (SCG);

configure a first guaranteed power for the MCG and a second guaranteed power for the SCG, wherein the first guaranteed power for the MCG and the second guaranteed power for the SCG are each a ratio of a maximum transmission power for the UE;

determine a transmission power of a physical uplink control channel (PUCCH) on the MCG with using at least the second guaranteed power and the maximum transmission power;

determine a transmission power of a PUSCH on the SCG with using at least the first guaranteed power and the maximum transmission power;

determine a transmission power of a physical random access channel (PRACH) on the MCG without using the second guaranteed power; and determine a transmission power of a PRACH on the SCG without using the first guaranteed power but with using at least the transmission power of the PRACH on the MCG.

2. The UE of claim 1, wherein
when there is not enough remaining transmit power for the PRACH on the SCG, then the PRACH on the SCG is dropped.

3. The UE of claim 1, wherein
when there is not enough remaining transmit power for the PRACH on the SCG, then the transmission power of the PRACH on the SCG is scaled down to fulfill the maximum transmission power.

4. The UE of claim 1, wherein
the first guaranteed power is allocated to the MCG, the second guaranteed power is allocated to the SCG, and the remaining power is shared across the MCG and the SCG according to a priority order.

5. An evolved node B (eNB) communicating with a user equipment (UE), the eNB comprising:
  a processor; and
  memory in electronic communication with the processor, wherein instructions stored in the memory are executable to:
  configure, to the UE, a master cell group (MCG) and a secondary cell group (SCG);
  configure, to the UE, a first guaranteed power for the MCG and a second guaranteed power for the SCG, wherein the first guaranteed power for the MCG and the second guaranteed power for the SCG are each a ratio of a maximum transmission power for the UE; and
  receive a physical uplink control channel (PUCCH) on the MCG and a physical random access channel (PRACH) on the MCG;
  wherein a transmission power(s) of the PUCCH on the MCG is determined with using at least the second guaranteed power and the maximum transmission power; and
  wherein at least a transmission power of the PRACH on the MCG is determined without using the second guaranteed power and the maximum transmission power.

6. The eNB of claim 5, wherein
the first guaranteed power is allocated to the MCG, the second guaranteed power is allocated to the SCG, and the remaining power is shared across the MCG and the SCG according to a priority order.

7. A method in a user equipment (UE), the method comprising:
  configuring a master cell group (MCG);
  configuring a secondary cell group (SCG);
  configuring a first guaranteed power for the MCG;
  configuring a second guaranteed power for the SCG, wherein the first guaranteed power for the MCG and the second guaranteed power for the SCG are each a ratio of a maximum transmission power for the UE;
  determining a transmission power of a physical uplink control channel (PUCCH) on the MCG with using at least the second guaranteed power and the maximum transmission power;
  determining a transmission power of a PUSCH on the SCG with using at least the first guaranteed power and the maximum transmission power;
  determining a transmission power of a physical random access channel (PRACH) on the MCG without using the second guaranteed power; and
  determining a transmission power of a PRACH on the SCG without using the first guaranteed power but with using at least the transmission power of the PRACH on the MCG.

8. The method of claim 7, wherein
the first guaranteed power is allocated to the MCG, the second guaranteed power is allocated to the SCG, and the remaining power is shared across the MCG and the SCG according to a priority order.

9. A method in an evolved node B (eNB) communicating with a user equipment (UE), the method comprising:
  configuring, to the UE, a master cell group (MCG);
  configuring, to the UE, a secondary cell group (SCG);
  configuring, to the UE, a first guaranteed power for the MCG;
  configuring, to the UE, a second guaranteed power for the SCG, wherein the first guaranteed power for the MCG and the second guaranteed power for the SCG are each a ratio of a maximum transmission power for the UE;
  receiving a physical uplink control channel (PUCCH) on the MCG; and
  receiving a physical random access channel (PRACH) on the MCG;
  wherein a transmission power(s) of the PUCCH on the MCG is determined with using at least the second guaranteed power and the maximum transmission power; and
  wherein at least a transmission power of the PRACH on the MCG is determined without using the second guaranteed power and the maximum transmission power.

10. The method of claim 9, wherein
the first guaranteed power is allocated to the MCG, the second guaranteed power is allocated to the SCG, and the remaining power is shared across the MCG and the SCG according to a priority order.

* * * * *